(12) United States Patent
Hattori et al.

(10) Patent No.: US 6,707,180 B2
(45) Date of Patent: Mar. 16, 2004

(54) COOLING METHOD AND STRUCTURE FOR A ROTATION OBJECT

(75) Inventors: Noboru Hattori, Kanagawa (JP); Masakazu Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/322,723

(22) Filed: Dec. 19, 2002

(65) Prior Publication Data
US 2003/0146667 A1 Aug. 7, 2003

(30) Foreign Application Priority Data

Feb. 6, 2002 (JP) .......................... 2002-029197

(51) Int. Cl.[7] ................................ H02K 9/06
(52) U.S. Cl. .............................. 310/61; 310/52; 310/57; 310/59
(58) Field of Search ............................ 310/61, 52, 53, 310/54, 55, 56, 57, 58, 59, 60 A

(56) References Cited

U.S. PATENT DOCUMENTS

| | | | | |
|---|---|---|---|---|
| 4,297,603 A | * | 10/1981 | Weghaupt | 310/53 |
| 4,679,314 A | * | 7/1987 | Lenz et al. | 29/598 |
| 4,908,347 A | * | 3/1990 | Denk | 505/166 |
| 5,670,838 A | * | 9/1997 | Everton | 310/254 |
| 5,859,482 A | * | 1/1999 | Crowell et al. | 310/58 |
| 6,426,574 B1 | * | 7/2002 | Hess et al. | 310/61 |

FOREIGN PATENT DOCUMENTS

JP        2000-295818 A     10/2000

* cited by examiner

*Primary Examiner*—Thanh Lam

(57) ABSTRACT

A coolant inlet and a coolant outlet are opened on an inner surface enclosing an inner space of a rotation object. The coolant inlet and the coolant outlet are located on a rotation axis and face each other. A main-stream which flows straightly along the rotation axis from the coolant inlet to the coolant outlet is generated in a central space of the inner space. Therefore, a resistance about the coolant stream is small. In addition, a sub-stream which circulates in a radial direction is generated in a peripheral space around the central space. By generating a contact between the main-stream and the sub-stream, it is possible to obtain high performance of cooling.

25 Claims, 28 Drawing Sheets

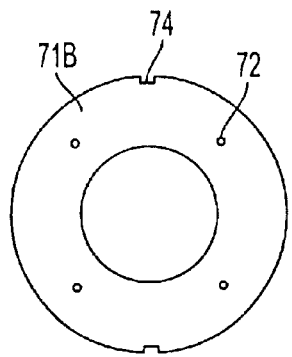  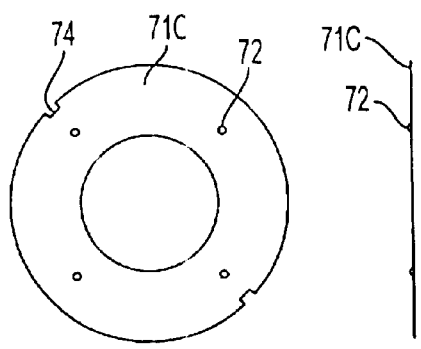
FIG. 27(A)  FIG. 27(B)  FIG. 27(C)  FIG. 27(D)
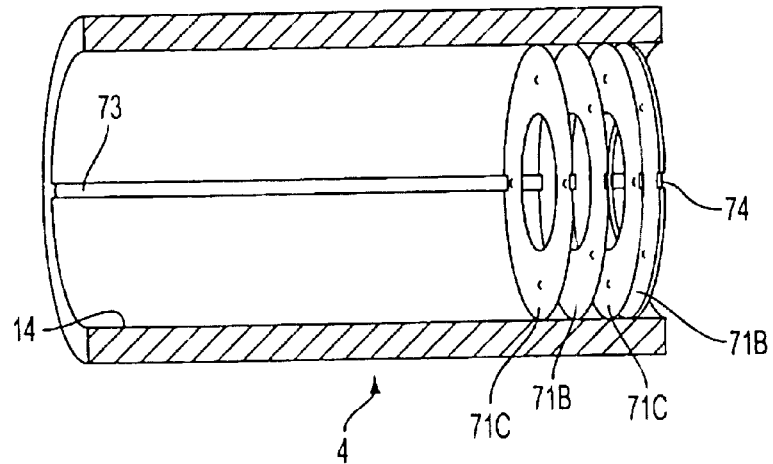
FIG. 27(E)

COOLING METHOD AND STRUCTURE FOR A ROTATION OBJECT

CROSS-REFERENCE TO RELATED PATENT APPLICATIONS

1. Field of the Invention

The present invention relates to a cooling structure for a rotation object. More particularly, the invention relates to a cooling structure which is structured in the rotation object and cools the rotation object from inside.

2. Description of the Related Art

JP-A 2000-295818 discloses a cooling structure for a rotor of a motor. The rotor has a solid shaft, a pipe surrounding the shaft, and a rotor core fixed onto the pipe. A clearance is created between a surface of the shaft and an inner surface of the pipe, and acts as a cooling passage. That is, the rotor core is cooled by coolant flowing through the clearance.

An inlet passage and an outlet passage exist in the inside of the solid shaft, and are formed along an axis of the shaft. The inlet passage is connected to the cooling passage by a connection passage, and the outlet passage is connected to the cooling passage by another connection passage. The two connection passages are formed along the radius of the shaft.

In this structure, the coolant has to pass through four bends. That is, an angle between the inlet passage and the connection passage, an angle between the two connection passages and the cooling passage, and an angle between the connection passage and the outlet passage are all 90 degrees. Therefore, resistance to a stream of the coolant is large. Further, the resistance is increased with increase of a rotation speed of the rotor.

SUMMARY OF THE INVENTION

The present invention provides a solution to the above-mentioned resistance to coolant stream. The cooling method and structure provided by the present invention reduces the resistance without reducing performance of cooling.

According to a first aspect of the present invention, there is provided a cooling method for a rotation object. The rotation object has a rotation axis and an inner space. The inner space has a coolant inlet which is located on the rotation axis and a coolant outlet which is located on the rotation axis. The coolant inlet and the coolant outlet face each other. The cooling method comprises generating a main-stream of the coolant in a central space of the inner space, the main-stream flowing straightly along the rotation axis from the coolant inlet to the coolant outlet; generating a sub-stream of the coolant in a peripheral space around the central space, the sub-stream circulating in a radial direction of the inner space; and generating a contact between the main-stream and the sub-stream, the contact being attended with a mix of the coolant of the main-stream and the coolant of the sub-stream.

According to a second aspect of the present invention, there is provided a cooling structure for a rotation object. The rotation object has a center portion and two end portions. The center portion and the two end portions are arranged on a rotation axis of the rotation object. The two end portions are supported by bearings. The cooling structure comprises an inner surface enclosing an inner space which is inside of the center portion and is filled with coolant; an inlet passage being located inside of the one end portion and having a coolant inlet which is opened on the inner surface; and an outlet passage being located inside of the another end portion and having a coolant outlet which is opened on the inner surface; wherein the coolant inlet and the coolant outlet are located on the rotation axis and facing each other, so that a central space which is defined as a space between the coolant inlet and the coolant outlet and a peripheral space which is defined as a space around the central space are formed in the inner space.

BRIEF DESCRIPTION OF THE DRAWINGS

FIGS. 27(A), 27(B), 27(C), and 27(D) are schematic views of a disk plate of the 22nd embodiment;

FIG. 27(E) is a schematic view of the rotor for explaining a fixing structure of the disk plate in the 22nd embodiment.

DETAILED DESCRIPTION OF THE PREFERRED EMBODIMENTS 1. 1st Embodiment

Figure 1:
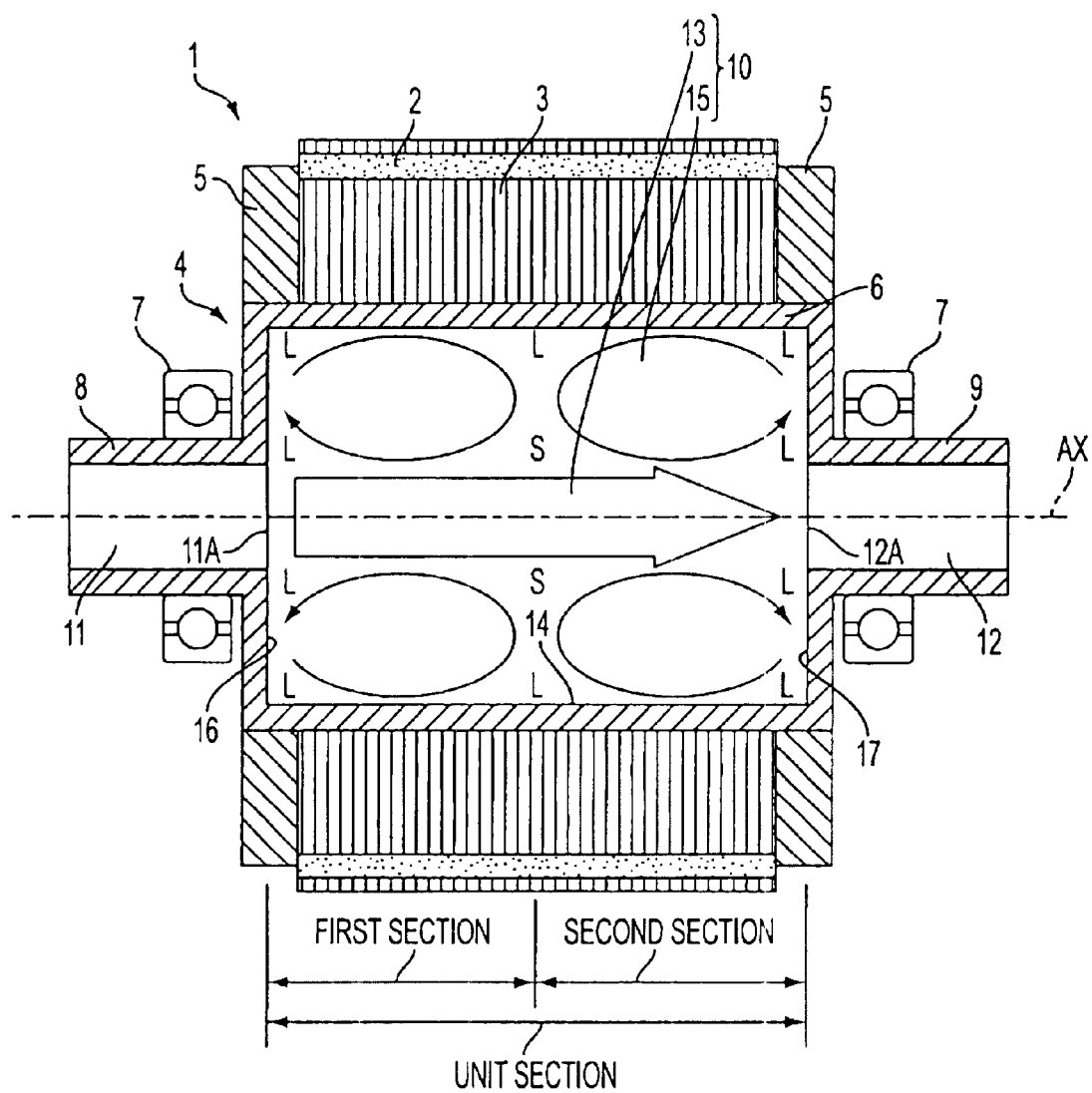
FIG. 1 is a section view of a rotor in a 1st embodiment to which the present invention is practically applied.

FIG. 1 shows schematically a rotor 1 to which the present invention is practically applied. The rotor 1 is a part of a permanent magnet type synchronous motor. The rotor 1 rotates in synchronism with a rotating magnetic field which is generated by a stator (not shown).

Two or more permanent magnets 2 are arranged in a rotor core 3. The rotor 1 is constructed of the rotor core 3 and a shaft 4 which penetrates the rotor core 3. The rotor core 3 is formed by piling up a lot of elements which are made of electromagnetic steel sheet and have a ring shape. Two side plates 5 which have a ring shape sandwich the rotor core 3.

The rotor core 3 and the two side plates 5 are fitted onto a large-diameter center portion 6 of the shaft 4. For example, by sliding the heated rotor core 3 and the two side plates 5 onto the large-diameter center portion 6, the rotor core 3 and the two side plates 5 are fastened to the large-diameter center portion 6 after a temperature of the rotor core 3 and the two side plates 5 fall to a normal temperature. Two bearings 7 are fitted onto small-diameter both end portions 8 and 9 of the shaft 4. The two bearings 7 are supported by a motor casing (not shown), and permit free rotation between the rotor 1 and the motor casing.

A diameter of the bearing 7 is determined in consideration of a specification of the motor, particularly maximum rotation speed. When the maximum rotation speed is high, it is better to use the bearing 7 with a small diameter. Therefore, a diameter of the small-diameter end portion 8 or 9 is smaller than a diameter of the large-diameter center portion 6.

A lot of eddy currents are generated inside of the permanent magnet 2 and the rotor core 3 during rotation of the rotor 1. Temperature of the rotor 1 increases by the eddy current. Since the eddy current becomes larger with an increase of variation of magnetic flux in the permanent magnet 2 and the rotor core 3, the temperature of the rotor 1 becomes high with increase of the rotation speed of the rotor 1. When the temperature of the permanent magnet 2 becomes high beyond a proper limit, demagnetization of the permanent magnet 2 occurs. Therefore, it is important to cool the rotor 1.

Details of the cooling structure of rotor 1 are explained next.

The shaft 4 is hollow, and a space inside the shaft 4 is filled with coolant (for example cooling oil). More specifically, a space 10 is located inside of the large-diameter center portion 6 of the shaft 4, an inlet passage 11 along an axis AX of the shaft 4 is located inside of the small-diameter end portion 8, and an outlet passage 12 along the axis AX is located inside of the small-diameter end portion 9. The coolant flows into the space 10 through the inlet passage 11, and flows out of the space 10 through the outlet passage 12. The space 10, the inlet passage 11, and the outlet passage 12 have a cylindrical shape. An inner diameter of the inlet passage 11 is equal to an inner diameter of the outlet passage 12. An inner diameter of the space 10 is larger than the inner diameter of the inlet passage 11 and the outlet passage. A center axis of the space 10, a center axis of the inlet passage 11, a center axis of the outlet passage 12, and the axis AX of rotation of the shaft 4 are coaxial. The space 10 is enclosed with a cylindrical surface 14, a first flat surface 16, and a second flat surface 17. The first flat surface 16 and the second flat surface 17 are normal to the axis AX. A coolant inlet 11A, which is an opening of the inlet passage 11, is opened on the first flat surface 16. A coolant outlet 12A, which is an opening of the outlet passage 12, is opened on the second flat surface 17. The coolant inlet 11A and the coolant outlet 12A are located on the axis AX, and face each other. The first flat surface 16 faces the coolant outlet 12A, and the second flat surface 17 faces the coolant inlet 11A.

Details of the coolant stream in the space 10 are explained next.

The coolant flows straightly along the axis AX from the coolant inlet 11A to the coolant outlet 12A. That is, a main-stream of the coolant is generated in a central space 13 which is defined as a space between the coolant inlet 11A and the coolant outlet 12A. In the FIG. 1, the main-stream is shown by a white arrow. Since there is no obstruction in the central space 13, resistance to the main-stream is very small. Therefore, a pump for circulating the coolant does not require much energy.

In a peripheral space 15 around the central space 13, a pair of sub-streams which circulate in a radial direction of the space 10 is generated. In the FIG. 1, the sub-stream is shown by arrows. The sub-stream is generated only when the rotor 1 is rotating. The sub-stream has a function of conveying heat from a high temperature portion of the rotor 1 to the main-stream. That is, by contact between the sub-stream and the cylindrical surface 14, heat generated inside of the permanent magnet 2 and the rotor core 3 is transferred to the coolant of the sub-stream, and by contact between the sub-stream and the main-stream, the heat is transferred to the coolant of the main-stream. In the contact between the sub-stream and the main-stream, the heat is transferred by conduction between high temperature coolant and low temperature coolant and also by mixing of high temperature coolant and low temperature coolant. Efficiency of the heat transfer from the sub-stream to the main-stream becomes very high by the mix of the coolant.

Details of the mechanism by which the sub-stream is generated are explained next.

The coolant in the peripheral space 15 contacts the cylindrical surface 14, the first flat surface 16, and the second flat surface 17. When the rotor 1 rotates, the coolant in the peripheral space 15 rotates about the axis AX. The rotation of the coolant is generated by viscosity of the coolant. That is, the coolant is dragged by the cylindrical surface 14, the first flat surface 16, and the second flat surface 17, and rotates. Therefore, the rotation speed of the coolant becomes low with an increase of distance from the surfaces, and centrifugal force on the coolant becomes small with an increase of distance from the surfaces. In FIG. 1, distribution of magnitude of the centrifugal force in the peripheral space 15 is shown by "L (large)" and "S (small)". More specifically, in a first section which is near to the coolant inlet 11A of the peripheral space 15, the magnitude of the centrifugal force at the same radial position becomes small as the axial position approaches the coolant outlet 12A. And in a second section which is near to the coolant outlet 12A of the peripheral space 15, the magnitude of the centrifugal force at the same radial position becomes small as the axial position approaches the coolant inlet 11A. Thus, symmetrical gradients of the centrifugal force arise in the first section and the second section. And in a unit section consisting of the first section and the second section, a pair of the sub-streams is generated by the symmetrical gradients of the centrifugal force.

The sub-stream is not generated during halt of the rotor 1, and develops as the rotation speed of the rotor 1 is increased. When the development of the sub-stream in comparison with a size of the peripheral space 15 is not sufficient, the contact between the sub-stream and the main-stream and the mix of the coolant are not obtained. In such a case, efficiency of the heat transfer from the cylindrical surface 14 to the coolant of the main-stream becomes low. Therefore, it is important to determine specifications of the peripheral space 15 so that the contact and the mix are obtained under normal rotation speed of the motor.

Figure 2:
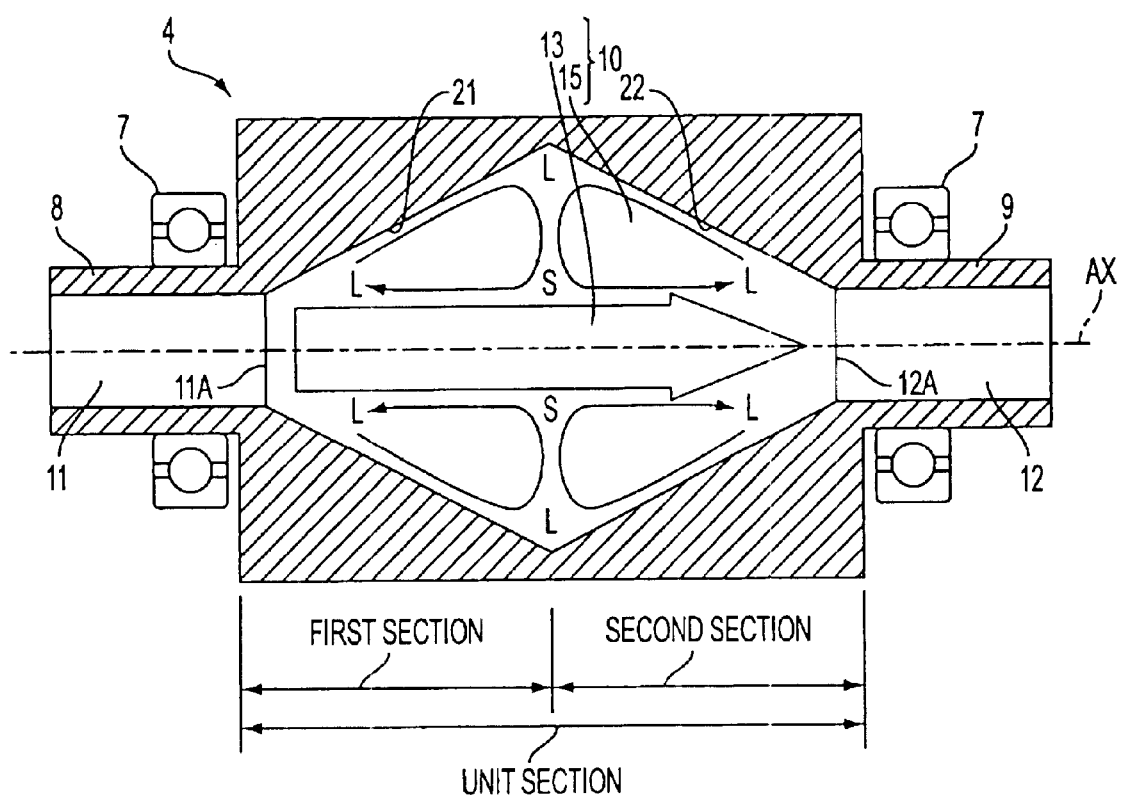
FIG. 2 is a section view of a portion of a rotor in a 2nd embodiment.

Since the efficiency of the heat transfer in the present invention becomes high with increase of rotation speed, the rotor 1 whose heating value is increased with increase of rotation speed is a suitable object to which the present invention is applied 2. 2nd Embodiment FIG. 2 shows schematically the shaft 4. This embodiment is almost the same as the first embodiment except for a shape of the peripheral space 15.

The peripheral space 15 is enclosed with an expanding conical surface 21 and a contracting conical surface 22. A center axis of the expanding conical surface 21 and a center axis of the contracting conical surface 22 are coaxial to the axis AX. An inner diameter of the expanding conical surface 21 becomes large as the axial position approaches the coolant outlet 12A. An inner diameter of the contracting conical surface 22 becomes small as the axial position approaches the coolant outlet 12A. In this embodiment, the coolant in the peripheral space 15 is dragged by the expanding conical surface 21 and the contracting conical surface 22, and rotates. The centrifugal force on the coolant becomes small with increase of radial distance from the surfaces.

Therefore, in the first section of the peripheral space 15, the magnitude of the centrifugal force at the same radial position becomes small as the axial position approaches the coolant outlet 12A. And in the second section of the peripheral space 15, the magnitude of the centrifugal force at the same radial position becomes small as the axial position approaches the coolant inlet 11A. Thus, in this embodiment, a gradient of the centrifugal force in the first section is generated by the expanding conical surface 21, and a gradient of the centrifugal force in the second section is generated by the contracting conical surface 22.

3. 3rd Embodiment

Figure 3:
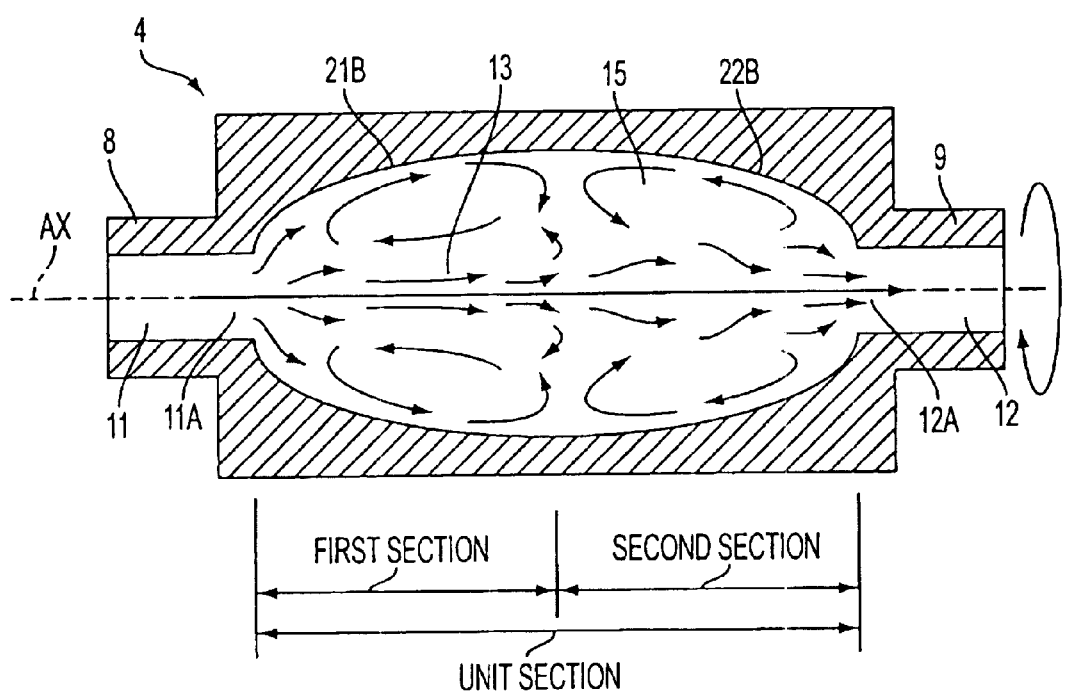
FIG. 3 is a section view of a portion of a rotor in a 3rd embodiment.

FIG. 3 shows schematically the shaft 4. This embodiment is almost the same as the first embodiment except for a shape of the peripheral space 15.

The peripheral space 15 is enclosed with an expanding spherical surface 21B and a contracting spherical surface 22B. An inner diameter of the expanding spherical surface 21B becomes large as the axial position approaches the coolant outlet 12A. An inner diameter of the contracting spherical surface 22B becomes small as the axial position approaches the coolant outlet 12A.

In this embodiment, a gradient of the centrifugal force in the first section is generated by the expanding spherical surface 21B, and a gradient of the centrifugal force in the second section is generated by the contracting spherical surface 22B.

4. 4th Embodiment

Figure 4:
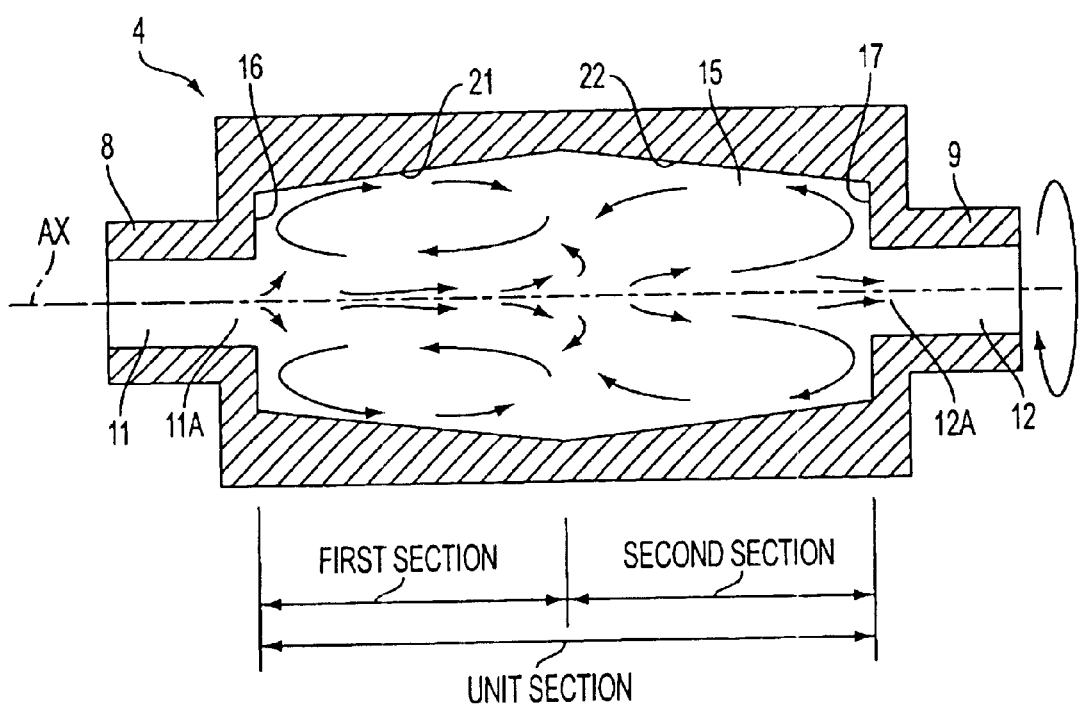
FIG. 4 is a section view of a portion of a rotor in a 4th embodiment.

FIG. 4 shows schematically the shaft 4. This embodiment is almost the same as the first embodiment except for a shape of peripheral space 15.

The peripheral space 15 is enclosed with the first flat surface 16, the expanding conical surface 21, the contracting conical surface 22, and the second flat surface 17.

In this embodiment, a gradient of the centrifugal force in the first section is generated by the first flat surface 16 and the expanding conical surface 21, and a gradient of the centrifugal force in the second section is generated by the contracting conical surface 22 and the second flat surface 17.

5. 5th Embodiment

Figure 5:
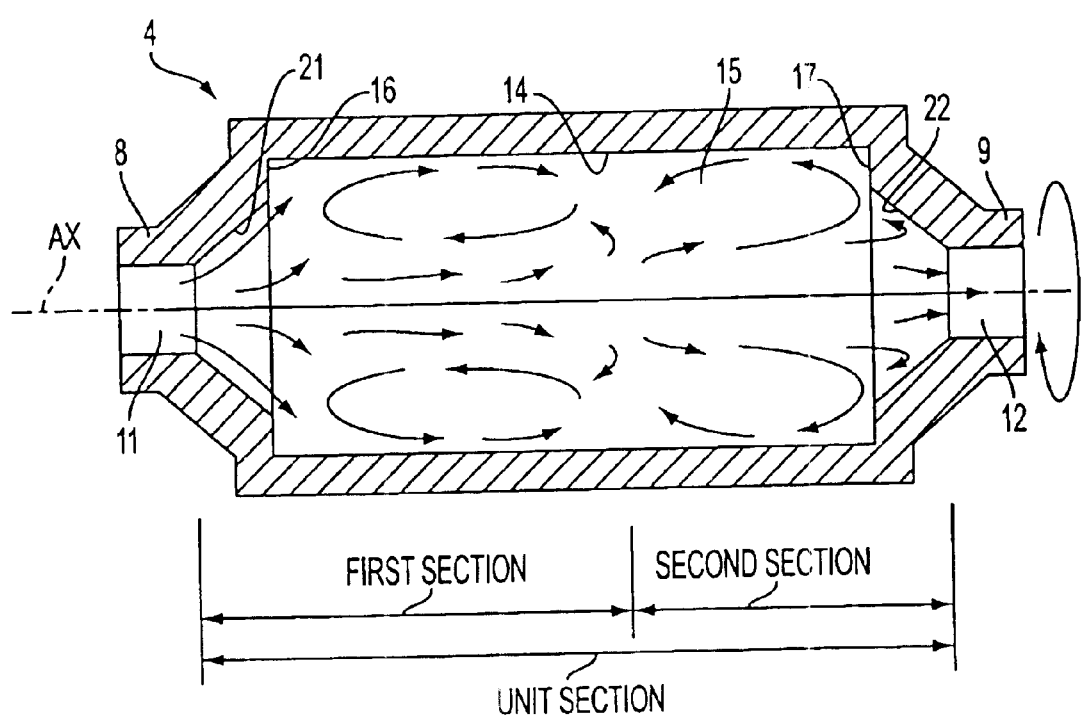
FIG. 5 is a section view of a portion of a rotor in a 5th embodiment.

FIG. 5 shows schematically the shaft 4. This embodiment is almost the same as the first embodiment except for a shape of the peripheral space 15.

The peripheral space 15 is enclosed with the expanding conical surface 21, the first flat surface 16, the cylindrical surface 14, the second flat surface 17, and the contracting conical surface 22.

In this embodiment, a gradient of the centrifugal force in the first section is generated by the expanding conical surface 21 and the first flat surface 16, and a gradient of the centrifugal force in the second section is generated by the second flat surface 17 and the contracting conical surface 22.

6. 6th Embodiment

Figure 6:
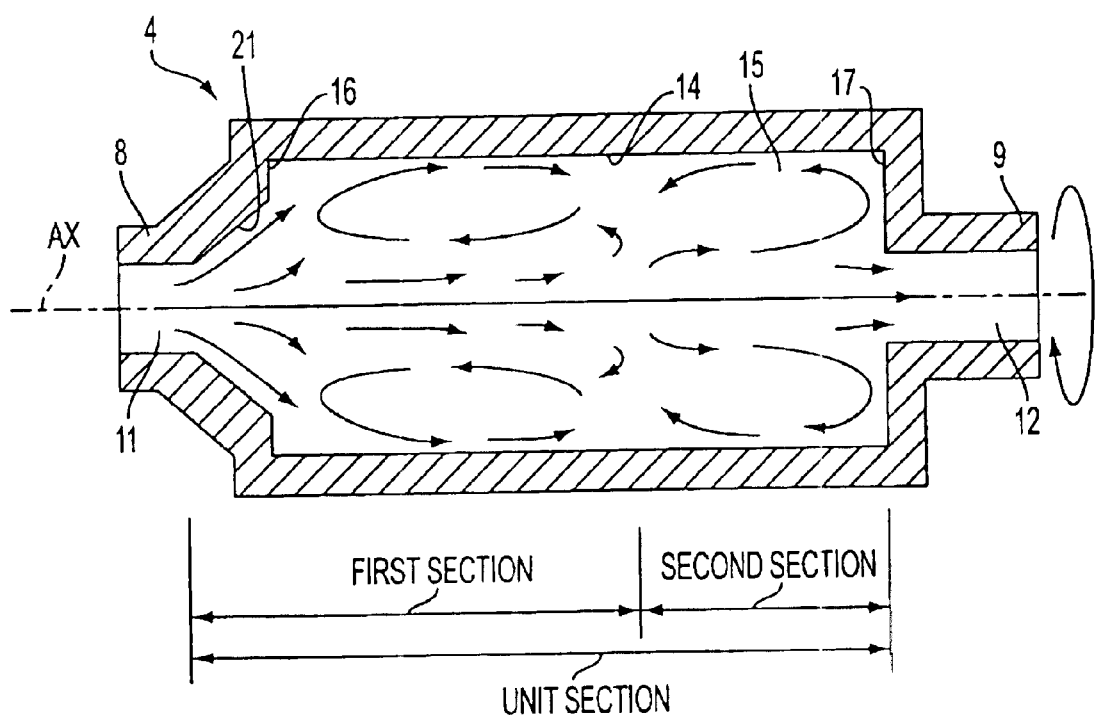
FIG. 6 is a section view of a portion of a rotor in a 6th embodiment.

FIG. 6 shows schematically the shaft 4. This embodiment is almost the same as the first embodiment except for a shape of the peripheral space 15.

The peripheral space 15 is enclosed with the expanding conical surface 21, the first flat surface 16, the cylindrical surface 14, and the second flat surface 17.

In this embodiment, a gradient of the centrifugal force in the first section is generated by the expanding conical surface 21 and the first flat surface 16, and a gradient of the centrifugal force in the second section is generated by the second flat surface 17.

Like this embodiment, a difference between a shape of the first section and a shape of the second section is permitted.

7. 7th Embodiment

Figure 7:
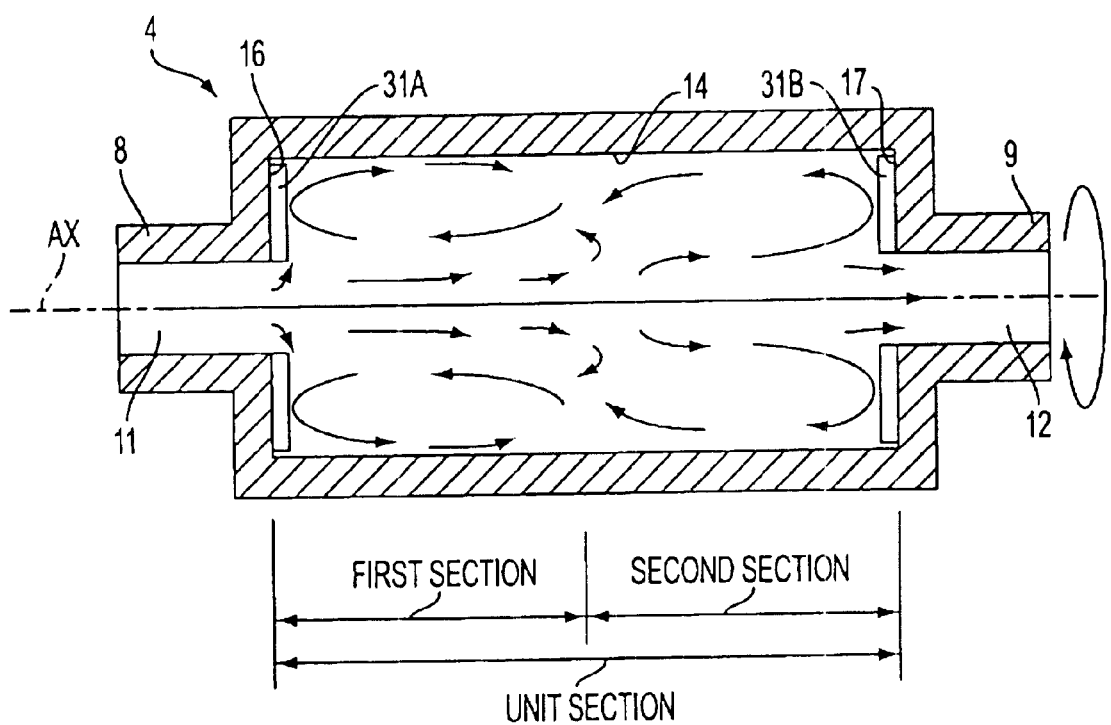
FIG. 7 is a section view of a portion of a rotor in a 7th embodiment.

FIG. 7 shows schematically the shaft 4. This embodiment is almost the same as the first embodiment except for a first impeller 31A and a second impeller 31B.

Figure 8A:
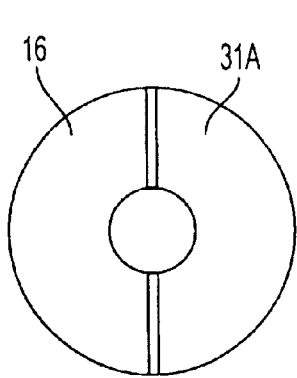
FIGS. 8(A), 8(B), and 8(C) are axial views of an impeller of the 7th embodiment.
Figure 8B:
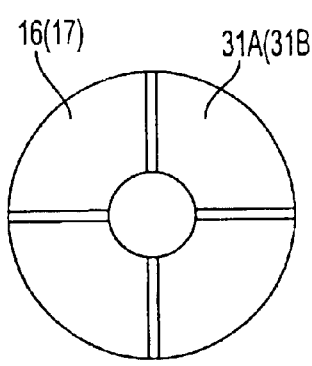
Figure 8C:
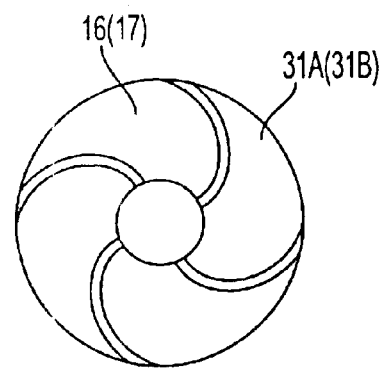

The first impeller 31A and the second impeller 31B are fixed to the first flat surface 16 and to the second flat surface 17 respectively, and rotate together with the shaft 4. By welding two thin blades to the first flat surface 16, it is possible to form the first impeller 31A. FIG. 8(A) is an axial view drawing of the first impeller 31A. The blade of the impeller 31A is arranged along a radius of the first flat surface 16. The second impeller 31B is the same as the first impeller 31A. FIG. 8(B) shows an alternative impeller having four blades. FIG. 8(C) shows an alternative impeller having spiral blades.

In this embodiment, the coolant in the peripheral space 15 is rotated by the first impeller 31A and the second impeller 31B. Therefore, it is possible to develop the sub-stream at a lower rotation speed. In addition, the first impeller 31A and the second impeller 31B act as a radiating fin.

In modification of the 2nd to 6th embodiments, the impeller is fixed to at least one of the first flat surface 16, the second flat surface 17, the expanding conical surface 21, the contracting conical surface 22, the expanding spherical surface 21B, and the contracting spherical surface 22B.

8. 8th Embodiment

Figure 9:
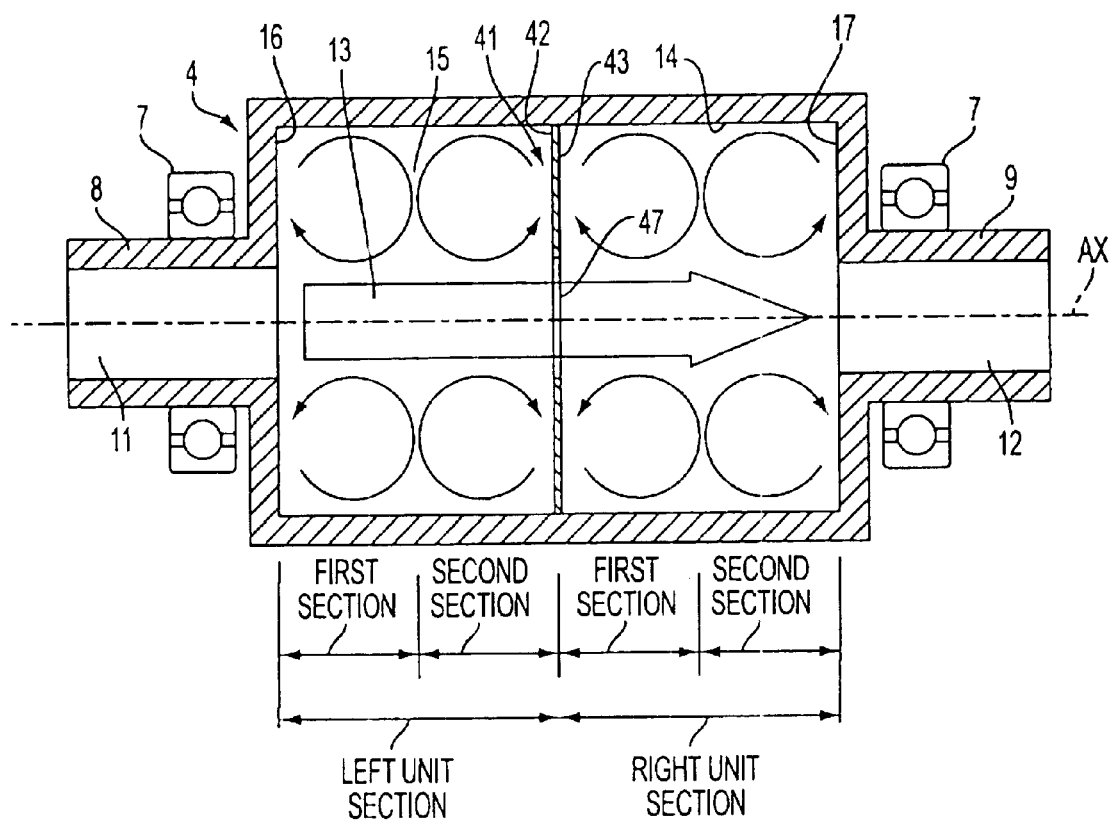
FIG. 9 is a section view of a portion of a rotor in an 8th embodiment.

FIG. 9 shows schematically the shaft 4. This embodiment is almost the same as the first embodiment except for a shape of the peripheral space 15.

In this embodiment, the peripheral space 15 is divided into a left unit section and a right unit section in direction of the axis AX by a thin disk plate 41. The disk plate 41 is fixed to the cylindrical surface 14 so that the disk plate is normal to the axis AX and rotates together with the shaft 4. The disk plate 41 has a hole 47 which is located at the center of the disk plate 41. A bore diameter of the hole 47 is approximately equal to the inner diameter of the inlet passage 11 and the outlet passage 12. Therefore, the disk plate 41 does not obstruct the main-stream in the central space 13.

The left unit section of the peripheral space 15 is enclosed with the first flat surface 16, the cylindrical surface 14, and a left surface 42 of the disk plate 41. Therefore, in the first section of the left unit section, the magnitude of the centrifugal force at the same radial position becomes small as the axial position approaches the coolant outlet 12A. And in the second section of the left unit section, the magnitude of the centrifugal force at the same radial position becomes small as the axial position approaches the coolant inlet 11A. Thus, symmetrical gradients of the centrifugal force arise in the left unit section. And a pair of the sub-streams is generated in the left unit section.

The right unit section of the peripheral space 15 is enclosed with a right surface 43 of the disk plate 41, the cylindrical surface 14, and the second flat surface 17. Therefore, in the first section of the right unit section, the magnitude of the centrifugal force at the same radial position becomes small as the axial position approaches the coolant outlet 12A. And in the second section of the right unit section, the magnitude of the centrifugal force at the same radial position becomes small as the axial position approaches the coolant inlet 11A. Therefore, a pair of the sub-streams is generated in the right unit section.

By generating two pairs of the sub-streams, the efficiency of the heat transfer becomes higher.

9. 9th Embodiment

Figure 10:
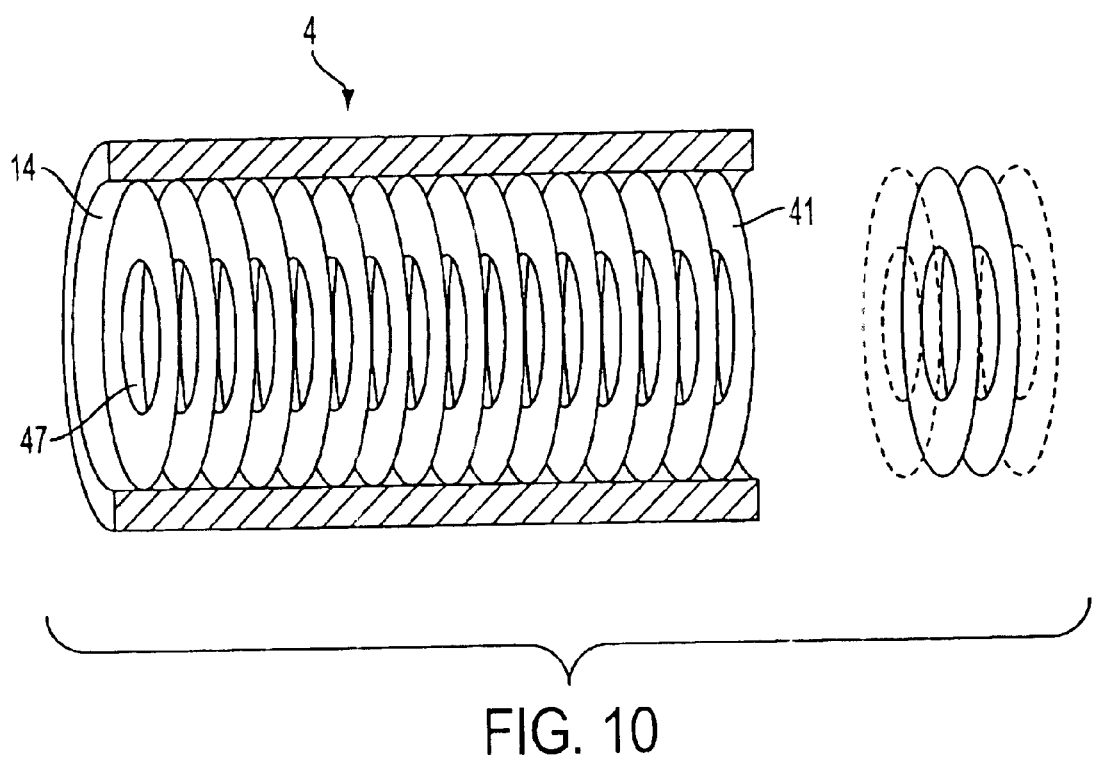
FIG. 10 is an internal view of a rotor in a 9th embodiment.

FIG. 10 shows schematically a portion of the shaft 4. This embodiment is almost the same as the 8th embodiment except for the number of the disk plates 41.

The number of the disk plates 41 is determined so that performance of cooling becomes sufficient.

Figure 11:
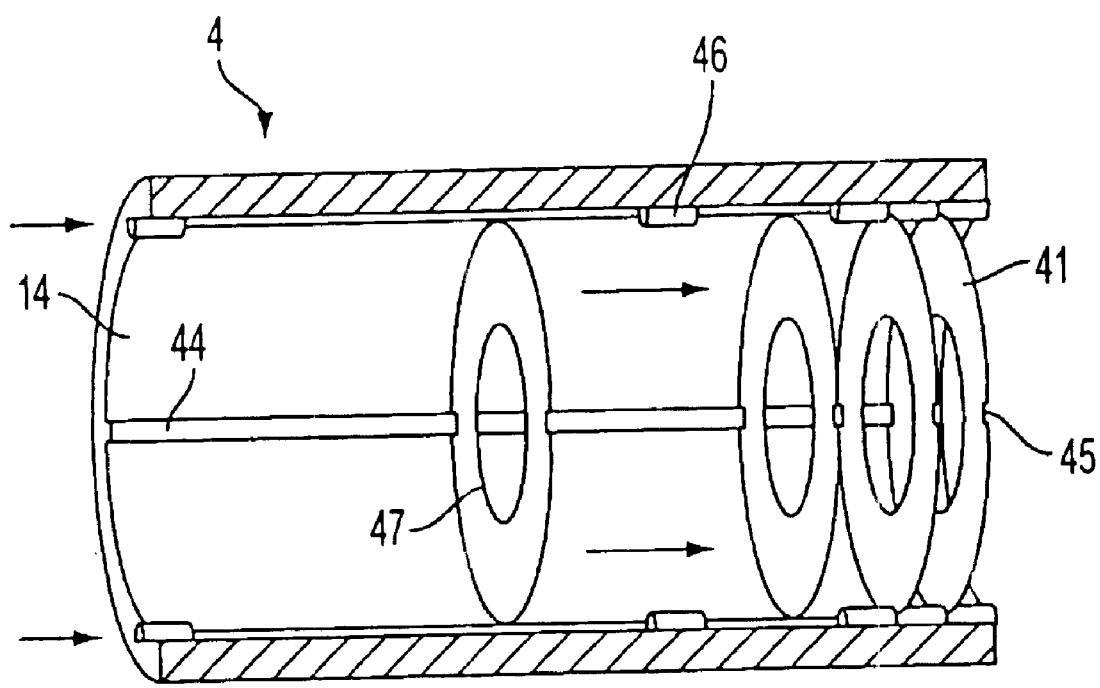
FIG. 11 is a schematic view of the rotor for explaining a fixing structure of a disk plate of the 10th embodiment.

When a lot of the disk plates 41 are necessary, it becomes difficult to fix the disk plates 41 to the cylindrical surface 14. One solution is shown in FIG. 11. In this solution, two projections 44 are formed on the cylindrical surface 14, and two depressions 45 are formed in the disk plate 41. The disk plate 41 is fixed to the cylindrical surface 14 by fitting the two projections 44 into the two depressions 45. In addition, a spacer 46 is arranged between adjacent disk plates 41, and creates fixed clearance.

10. 10th Embodiment

Figure 12:
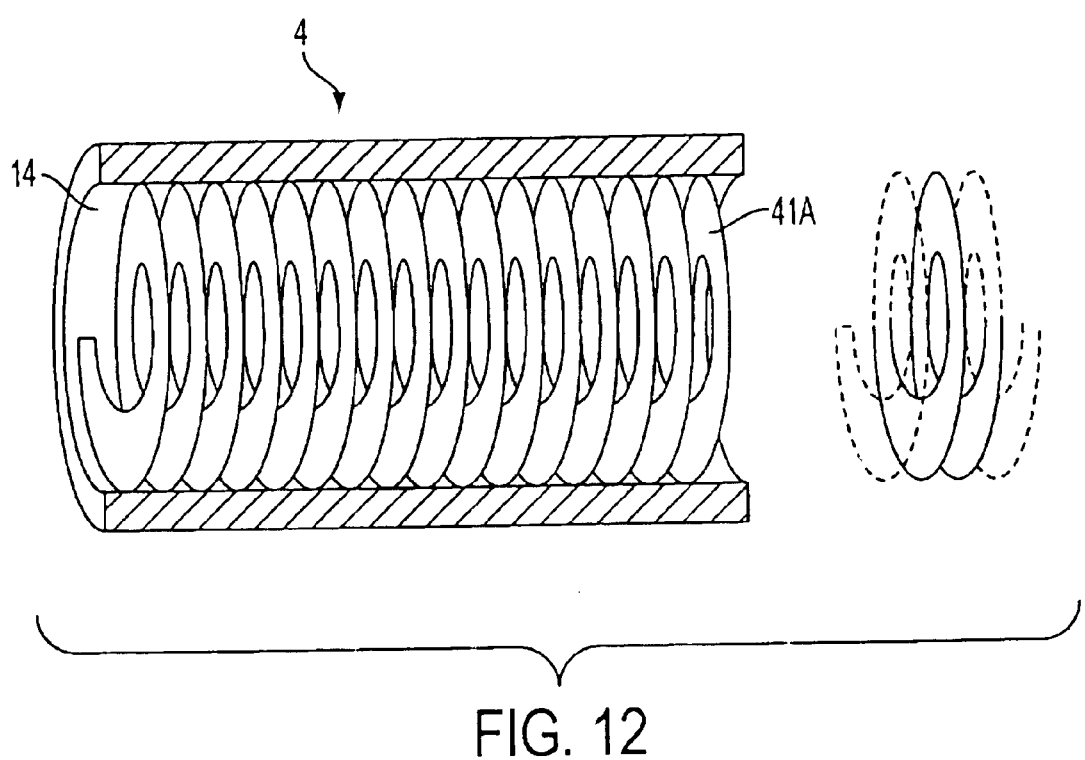
FIG. 12 is an internal view of a rotor in the 10th embodiment.

FIG. 12 shows schematically a portion of the shaft 4. This embodiment is almost the same as the 9th embodiment except for a disk-like plate 41A.

In this embodiment, the disk-like plate 41A which has a spiral structure is fixed to the cylindrical surface 14. By using the disk-like plate 41A, it becomes easy to divide the peripheral space 15 into a lot of the unit sections. But, when a pitch of the spiral of the disk-like plate 41A is large, a surface of the disk-like plate 41A does not become normal to the axis, so that an undesired stream may be generated in the peripheral space 15. Therefore, it is important to use the disk-like plate 41A with a small pitch.

11. 11th Embodiment

Figure 13:
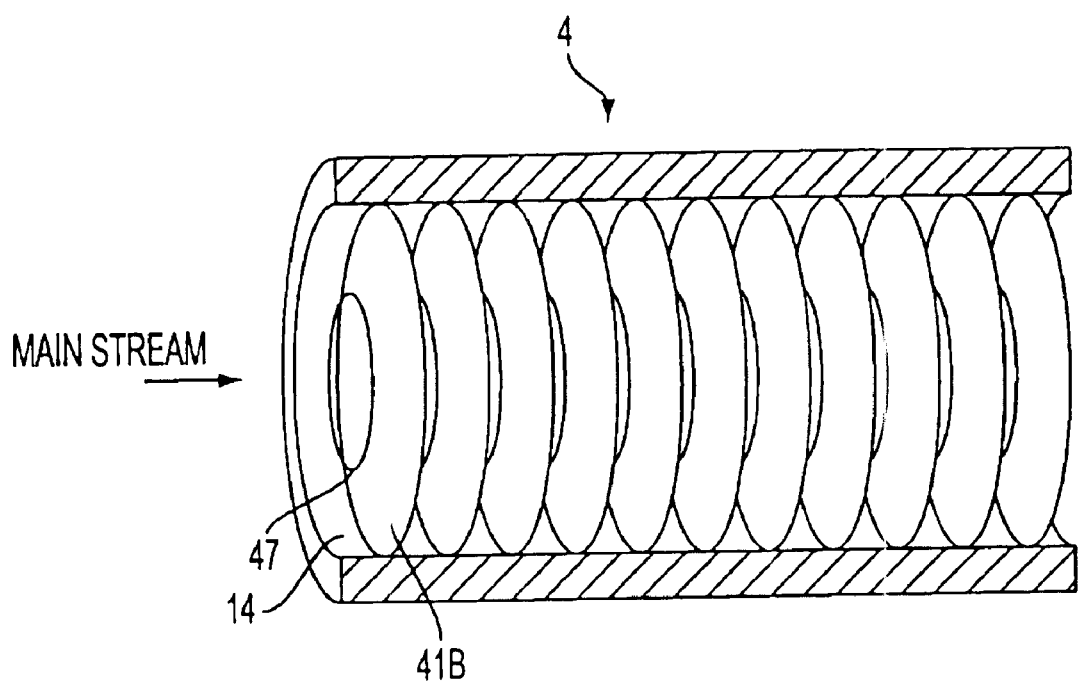
FIG. 13 is an internal view of a rotor in an 11th embodiment.

FIG. 13 shows schematically a portion of the shaft 4. This embodiment is almost the same as the 9th embodiment except for a disk plate 41B.

In this embodiment, the disk plate 41B which has a conical structure is fixed to the cylindrical surface 14 so that the upstream-side of the disk plate 41B becomes convex. The bore diameter of the hole 47 is slightly smaller than the inner diameter of the inlet passage 11 and the outlet passage 12.

In this embodiment, a small amount of the coolant of the mainstream is led to the peripheral space 15. Therefore, the mixing of the main-stream and the sub-stream is promoted, so that the efficiency of the heat transfer becomes higher. But, since the resistance to the mainstream becomes large with an increase of the amount of the coolant to be led to the peripheral space 15, it is important to determine a shape of the disk plate 41B and the bore diameter of the hole 47 so that a balance between the efficiency and the resistance becomes good.

12. 12th Embodiment

Figure 14:
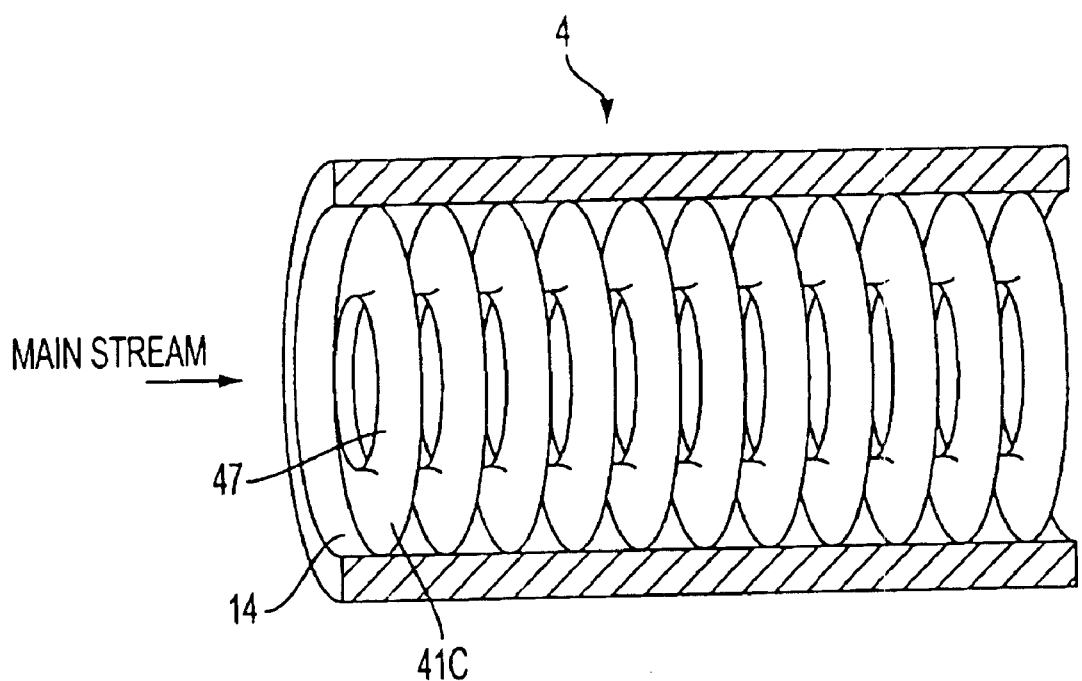
FIG. 14 is an internal view of a rotor in a 12th embodiment.

FIG. 14 shows schematically a portion of the shaft 4. This embodiment is almost the same as the 11th embodiment except for a disk plate 41C.

The disk plate 41C is a flat plate basically. An edge of the hole 47 is bent in the direction of the coolant inlet and is cylindrical. The bore diameter of the hole 47 is slightly smaller than the inner diameter of the inlet passage 11 and the outlet passage 12. The mixing of the mainstream and the sub-stream is promoted by this design of the disk plate 41C.

13. 13th Embodiment

Figure 15:
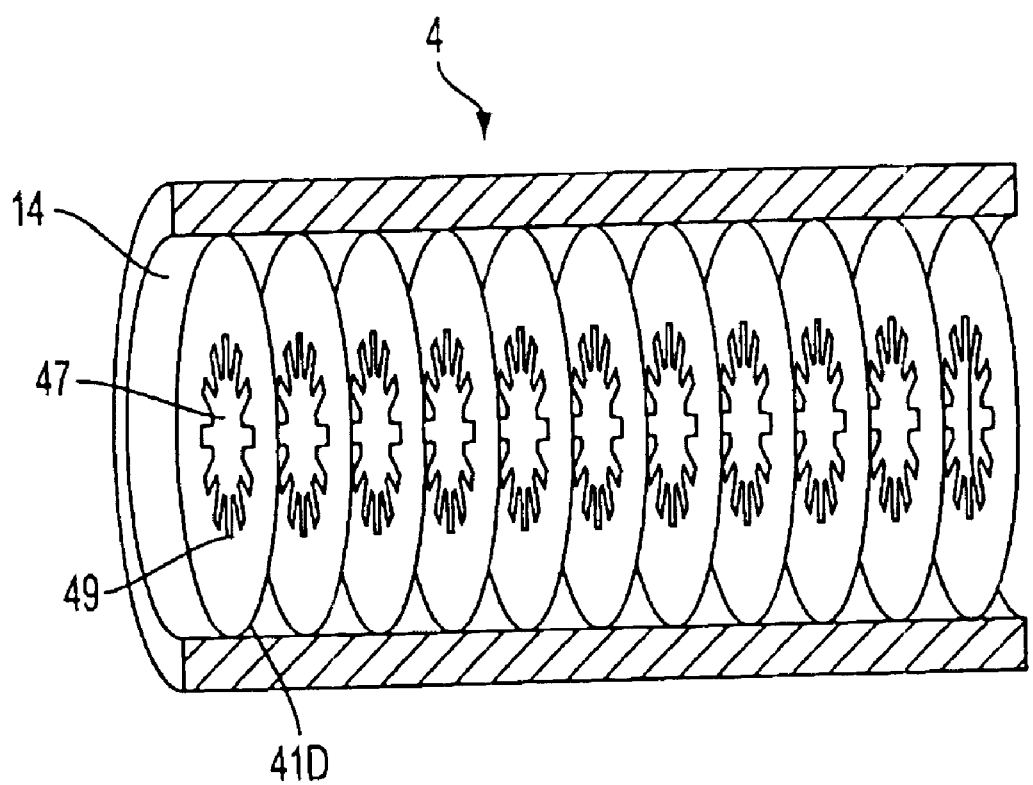
FIG. 15 is an internal view of a rotor in a 13th embodiment.

FIG. 15 shows schematically a portion of the shaft 4. This embodiment is almost the same as the 9th embodiment except for a disk plate 41D.

The hole 47 of the disk plate 41D has a serrated-edge 49. In this embodiment, turbulence is generated in the main-stream by the serrated-edge 49, so that the mixing of the main-stream and the sub-stream is promoted.

14. 14th Embodiment

Figure 16:
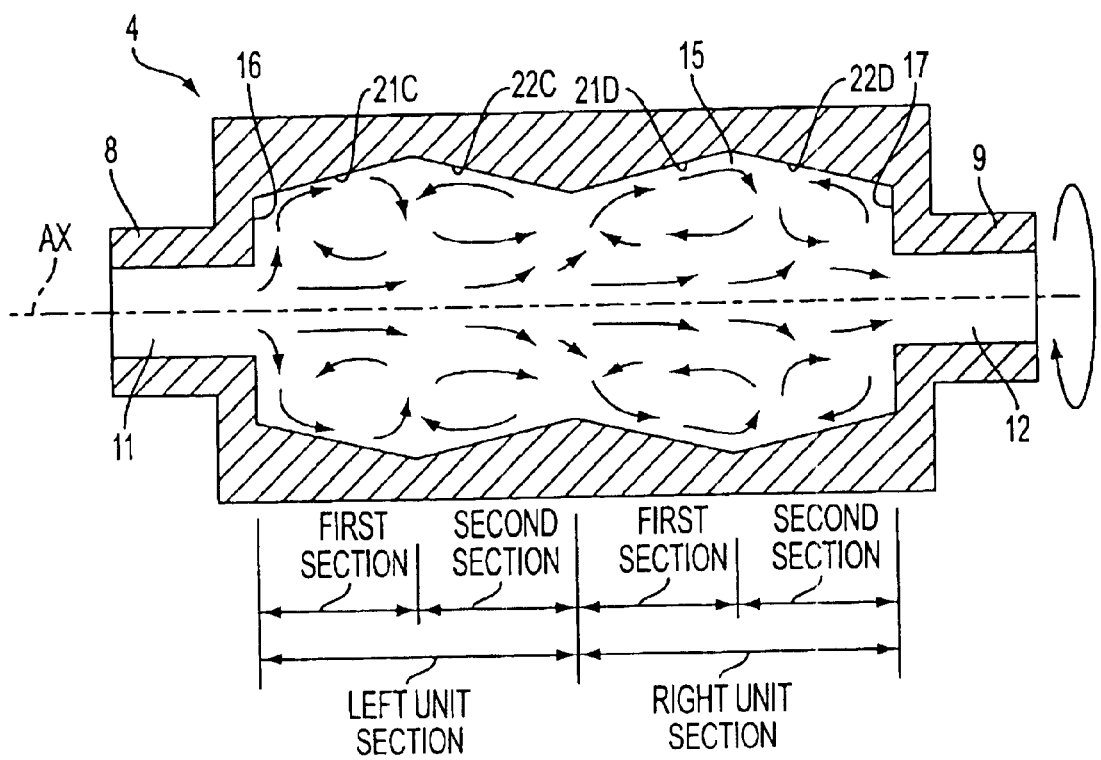
FIG. 16 is a section view of a portion of a rotor in a 14th embodiment.

FIG. 16 shows schematically the shaft 4. This embodiment is almost the same as the 8th embodiment except for a shape of the peripheral space 15.

The peripheral space 15 is enclosed with the first flat surface 16, a left expanding conical surface 21C, a left contracting conical surface 22C, a right expanding conical surface 21D, a right contracting conical surface 22D, and the second flat surface 17. The peripheral space 15 is divided into the left unit section and the right unit section.

In the first section of the left unit section, a gradient of the centrifugal force is generated by the first flat surface 16 and the left expanding conical surface 21C. And in the second section of the left unit section, a gradient of the centrifugal force is generated by the left contracting conical surface 22C. Therefore, a pair of the sub-streams is generated in the left unit section.

In the first section of the right unit section, a gradient of the centrifugal force is generated by the right expanding conical surface 21D. And in the second section of the right unit section, a gradient of the centrifugal force is generated by the right contracting conical surface 22D and the second flat surface 17. Therefore, a pair of the sub-streams is generated in the right unit section.

15. 15th Embodiment

Figure 17:
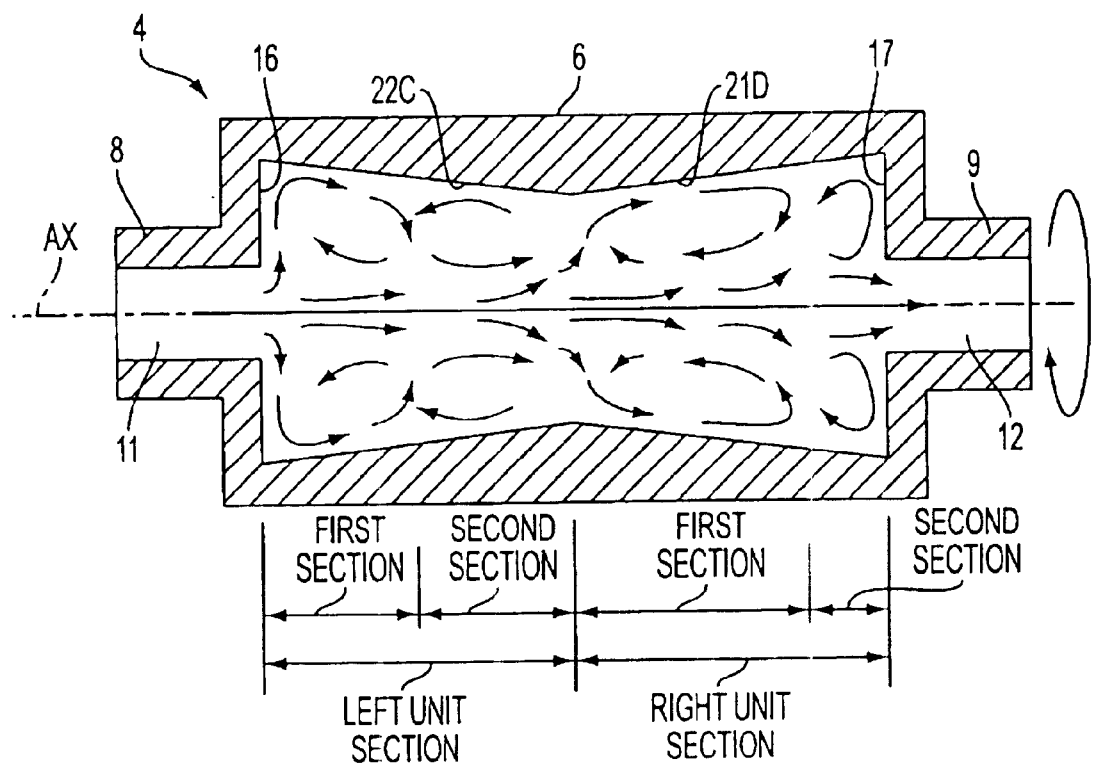
FIG. 17 is a section view of a portion of a rotor in a 15th embodiment.

FIG. 17 shows schematically the shaft 4. This embodiment is almost the same as the 14th embodiment except for a shape of the peripheral space 15.

The peripheral space 15 is enclosed with the first flat surface 16, the left contracting conical surface 22C, the right expanding conical surface 21D, and the second flat surface 17. The peripheral space 15 is divided into the left unit section and the right unit section. A pair of the sub-streams is generated in the left unit section and the right unit section.

16. 16th Embodiment

Figure 18A:
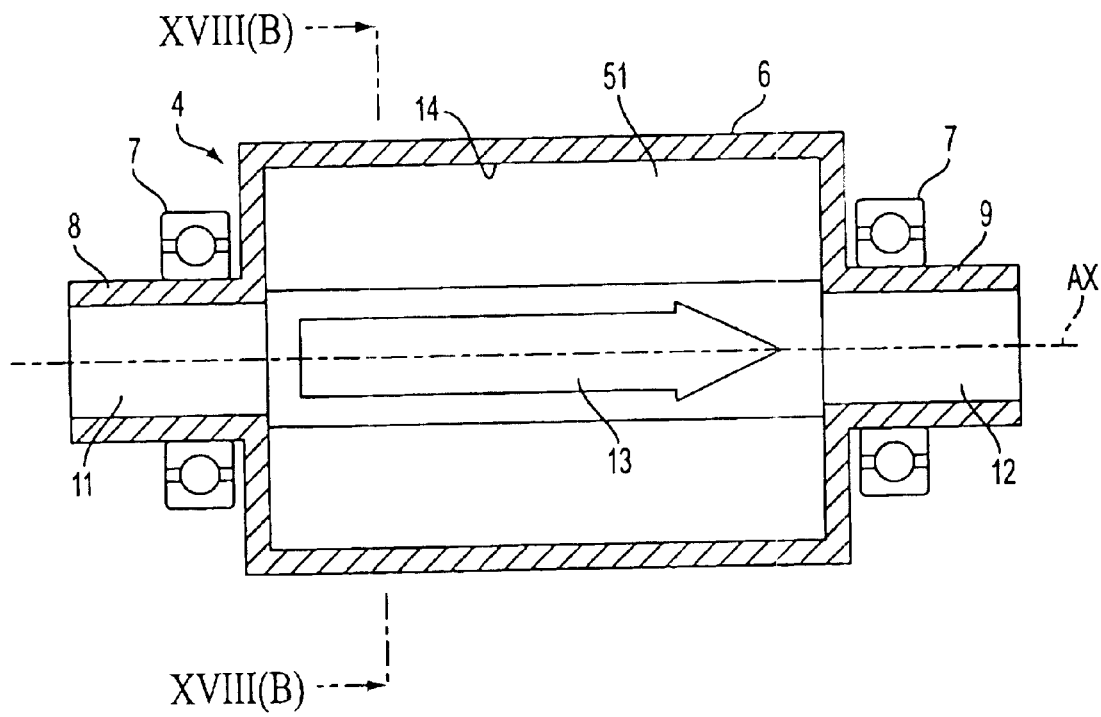
FIG. 18(A) is a section view of a portion of a rotor in a 16th embodiment.
Figure 18B:
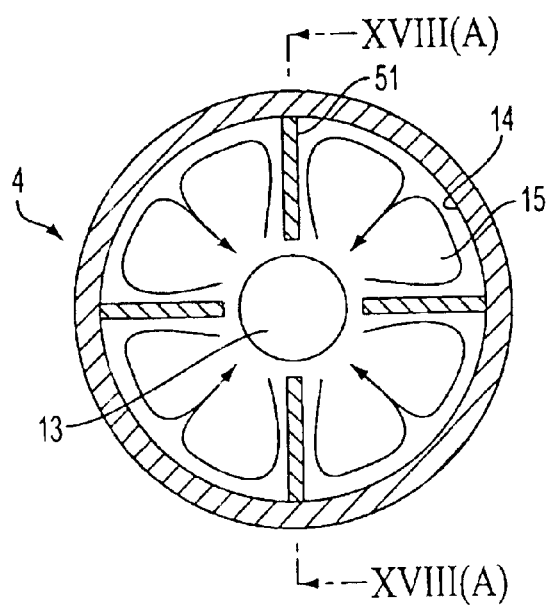
FIG. 18(B) is an axial section view of a portion of the rotor in the 16th embodiment.

FIG. 18(A) and FIG. 18(B) show schematically the shaft 4. The shaft 4 is a part of the rotor of a permanent magnet type synchronous motor. Common reference numerals are used in common elements between this embodiment and the first embodiment. Although the permanent magnet, the rotor core, and the two side plates are common elements, they are not shown in FIG. 18(A) and FIG. 18(B).

In this embodiment, the peripheral space 15 is divided into four sections in the direction of circumference by four thin wall plates 51. The four wall plates 51 are fixed to the cylindrical surface 14 and rotate together with the shaft 4. The sub-streams which circulate in radial direction are generated in the four sections.

Details of the mechanism by which the sub-stream is generated are explained next.

The coolant in the peripheral space 15 rotates together with the shaft 4. The rotation speed of the coolant is approximately uniform in the peripheral space 15. Therefore, centrifugal force to be exerted on the coolant in the peripheral space 15 is proportional to the radial position and the rotation speed of the shaft 4. When the bore diameter of the cylindrical surface 14 is a few centimeters and the rotation speed of the shaft 4 is a few thousands rpm, centrifugal acceleration on the coolant becomes a few hundred times acceleration of gravity.

In such a centrifugal acceleration field, the coolant of low density moves in the direction of the center of the rotation, and the coolant of high density moves in the direction of the centrifugal acceleration. In addition, a gradient of the coolant temperature in the radial direction arises in the peripheral space 15. That is, the coolant near the cylindrical surface 14 is heated by the cylindrical surface 14 and becomes high temperature, so that the density becomes low. On the other hand, the temperature of coolant near the central space 13 is low, and the density is high. Therefore, natural convections of the coolant arise in the peripheral space 15. The natural convections are the sub-streams in this embodiment. Since the centrifugal acceleration is very large as mentioned above, the sub-streams develop sufficiently even if the difference of the temperature (density) is small.

In common with above-mentioned embodiments, the sub-streams develop with an increase of the rotation speed of the shaft 4. Therefore, in common with above-mentioned embodiments, it is important to determine specifications of the peripheral space 15 in consideration of the normal rotation speed of the motor.

Figure 19:
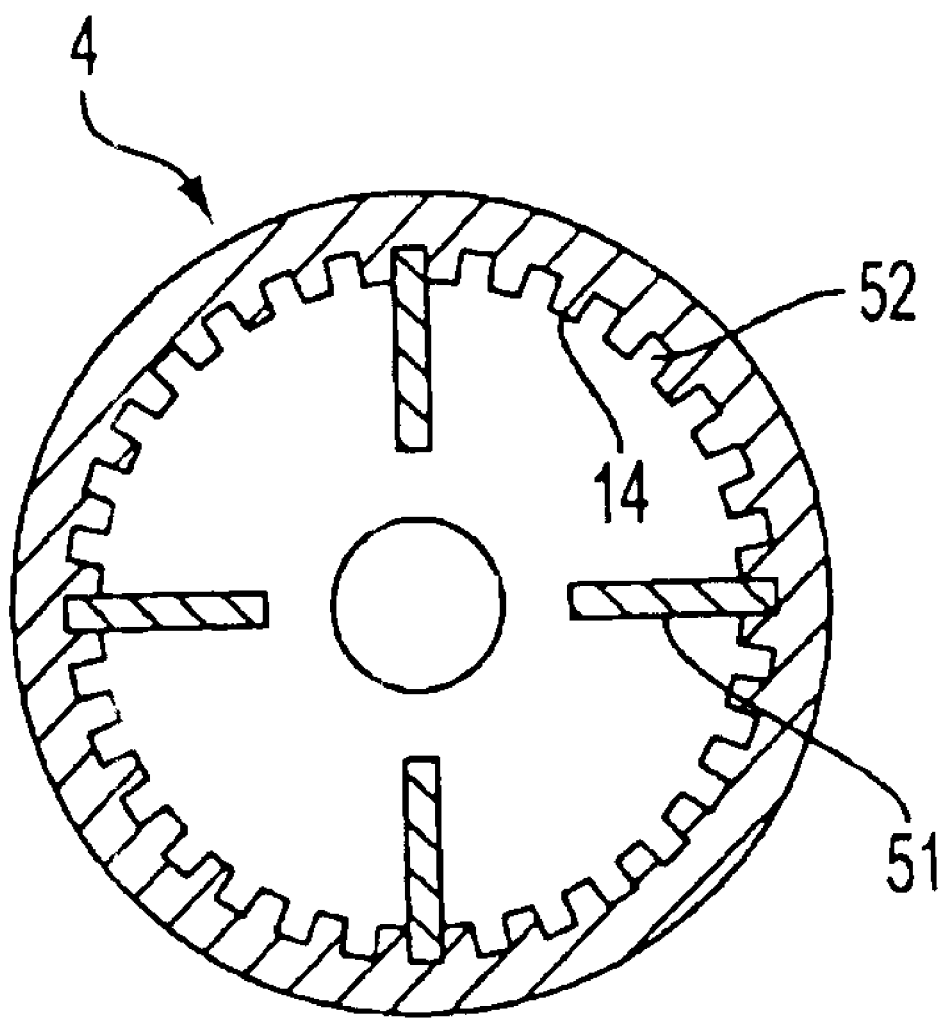
FIG. 19 is a section view of a portion of the rotor for explaining a fixing structure of a wall plate of the 16th embodiment.

FIG. 19 shows a fixing structure of the wall plate 51. In this structure, a lot of channels 52 along the axis are formed on the cylindrical surface 14. A root of the wall plate 51 is fitted into one of the channels 52 and is welded. It is possible to fix the wall plate 51 securely by this structure. In addition, heat transfer to the coolant is improved by the channels 52 which do not support the wall plate 51.

17. 17th Embodiment

Figure 20A:
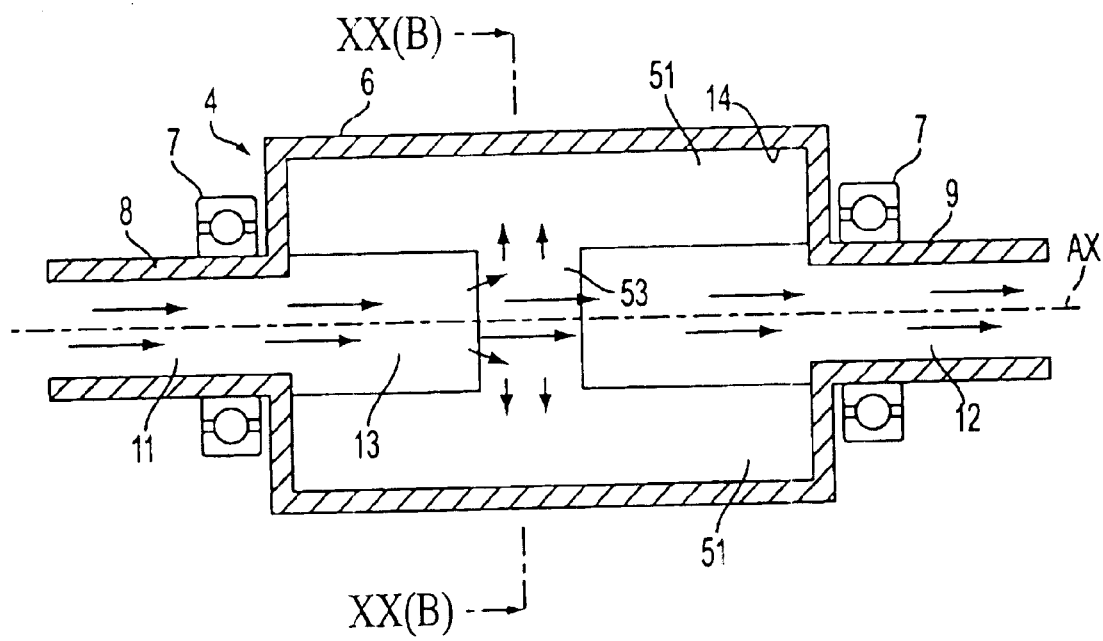
FIG. 20(A) is a section view of a portion of a rotor in a 17th embodiment.
Figure 20B:
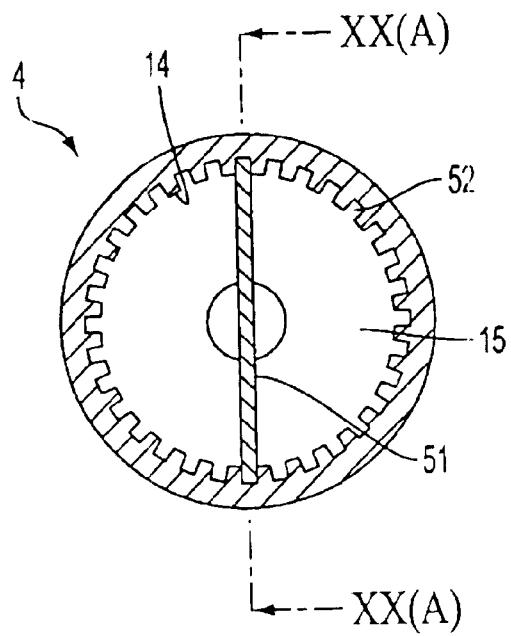
FIG. 20(B) is an axial section view of a portion of the rotor in the 17th embodiment.

FIG. 20(A) and FIG. 20(B) show schematically the shaft 4. This embodiment is almost the same as the 16th embodiment except for a connection part 53.

The connection part 53 connects the two wall plates 51. The peripheral space 15 is divided into two sections in the direction of circumference.

In this embodiment, the two plates 51 are fitted into two channels 52 which face each other. And welding is not necessary.

The connecting part 53 is located across the central space 13, and imparts a rotary motion to the main-stream in the central space 13. The rotary motion leads the main-stream to the peripheral space 15, so that the sub-stream is promoted and the efficiency of heat transfer becomes high. But, since the resistance to the main-stream becomes large with increase of the rotary motion to be imparted, it is important to determine a width of the connecting part 53 so that a balance between the efficiency and the resistance becomes good.

18. 18th Embodiment

Figure 21:
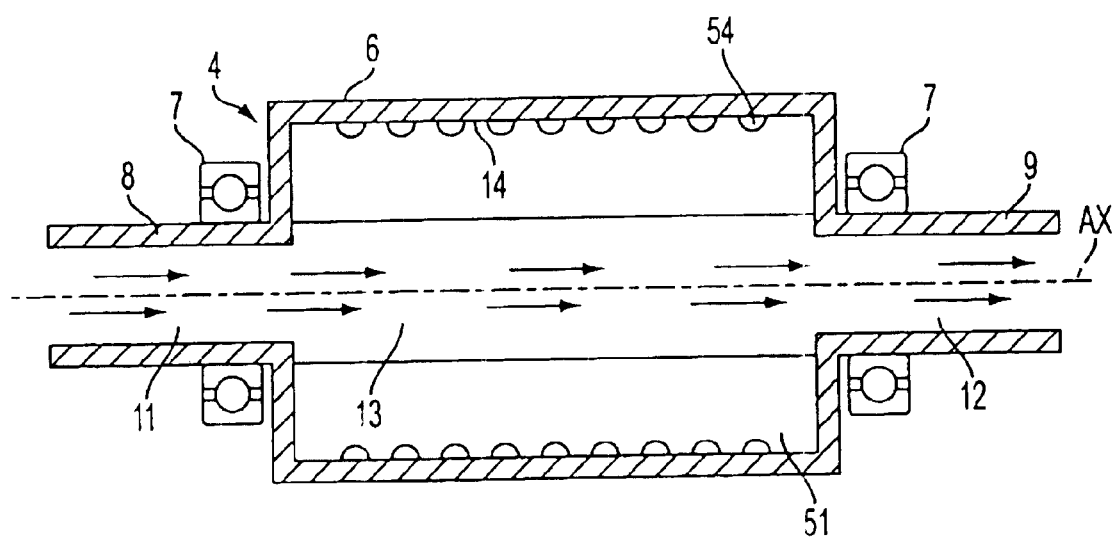
FIG. 21 is a section view of a portion of a rotor in an 18th embodiment.

FIG. 21 shows schematically the shaft 4. This embodiment is almost the same as the 16th embodiment except for a slot 54.

A lot of the slots 54 are formed at the root of the wall plate 51 at regular intervals.

Figure 22:
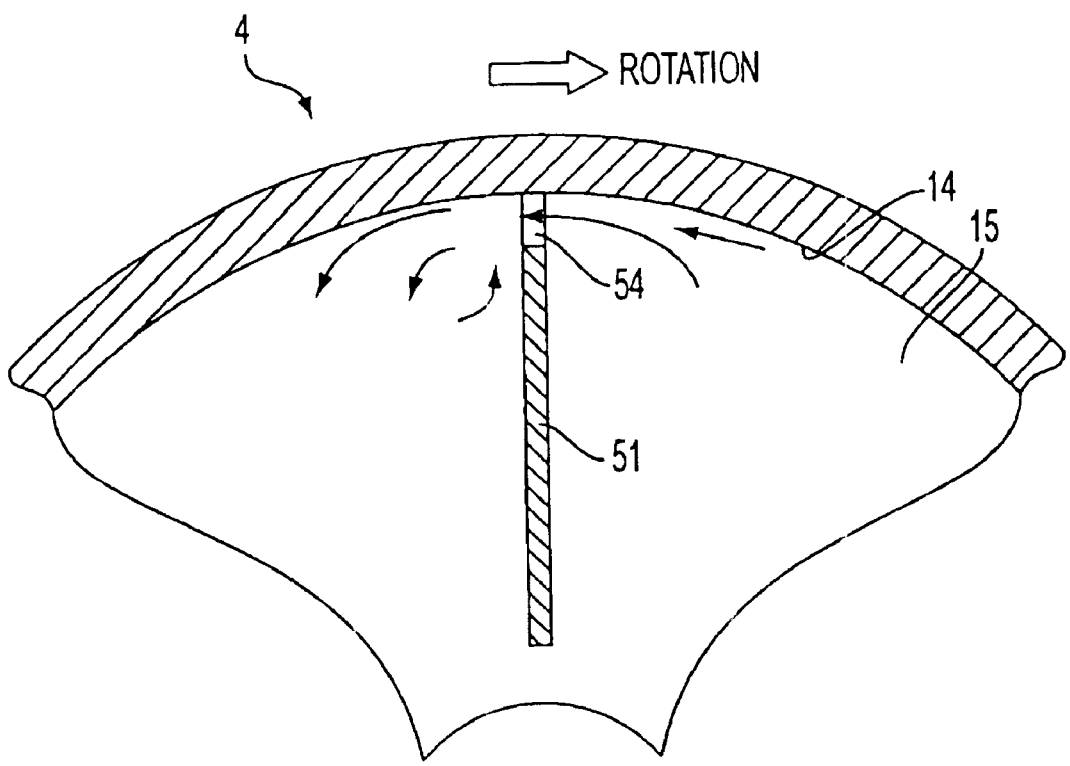
FIG. 22 is a section view of a portion of the rotor for explaining streams of coolant in the 18th embodiment.

Although most of the coolant in the peripheral space 15 rotates together with the shaft 4, small-scale streams passing through the slot 54 are generated near the cylindrical surface 14, as shown in FIG. 22. A heat boundary layer on the cylindrical surface 14 is reduced by the streams, so that heat transfer to the coolant is improved.

19. 19th Embodiment

Figure 23:
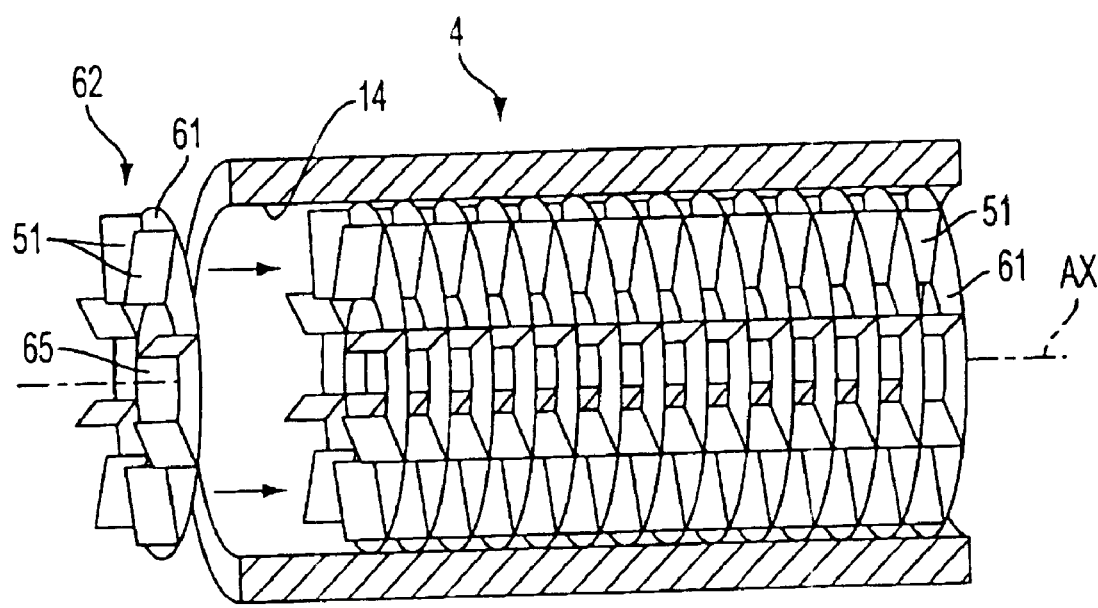
FIG. 23 is an internal view of a rotor in a 19th embodiment.

FIG. 23 shows schematically a portion of the shaft 4. This embodiment is almost the same as the 16th embodiment except for a wall plate 61.

In this embodiment, the peripheral space 15 is divided into eight sections in the direction of circumference by the eight wall plates 51, and is divided into a lot of sections in the direction of the axis by a lot of the wall plates 61. Each of the wall plates 61 has a hole 65 which is located at the center of the wall plate 61. A bore diameter of the hole 65 is approximately equal to the inner diameter of the inlet passage 11 and the outlet passage 12. Therefore, the wall plates 61 do not obstruct the mainstream in the central space 13.

The wall plates 51 and the wall plates 61 are formed simultaneously by arranging a lot of elements 62 in the direction of the axis. Each of the elements 62 has one wall plate 61 and eight partial wall plates 51.

In this embodiment, since the peripheral space 15 is divided into small cells, it is possible to rotate the coolant in the peripheral space 15 reliably together with the shaft 4. That is, it is possible to generate the centrifugal acceleration field reliably.

20. 20th Embodiment

Figure 24:
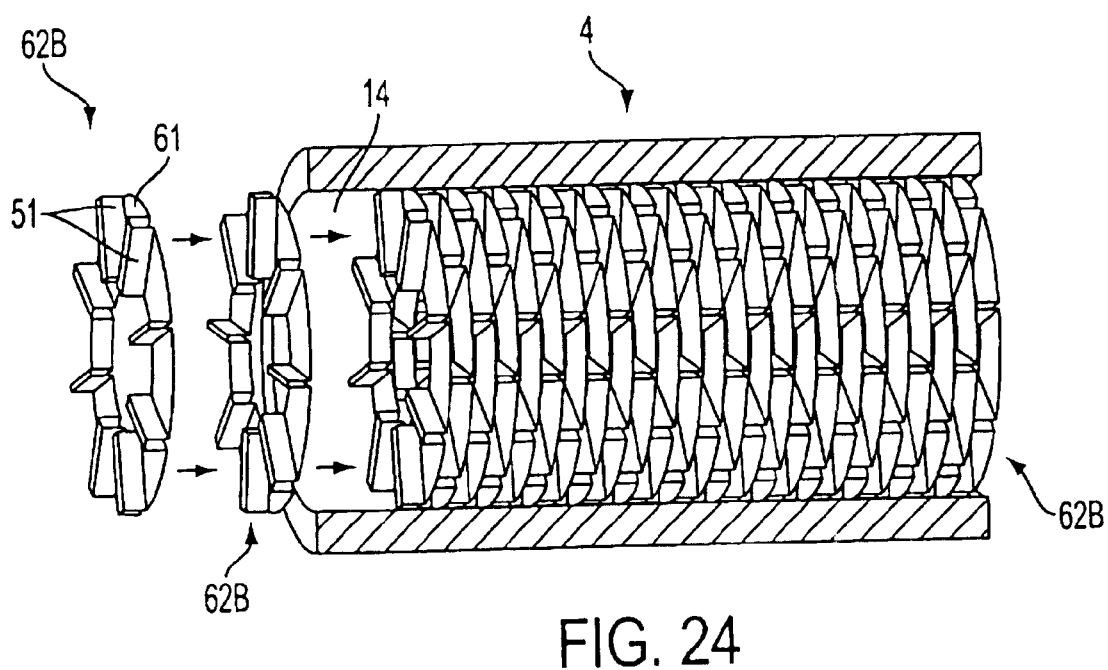
FIG. 24 is an internal view of a rotor in a 20th embodiment.

FIG. 24 shows schematically a portion of the shaft 4. This embodiment is almost the same as the 19th embodiment except for an element 62B.

The element 62B is formed by a metal sheet. That is, the element 62B before processing is a flat ring-like shape, and has eight sector portions and eight rectangle portions. By the processing, the eight rectangle portions are folded to a U-shape, and become the partial wall plates 51. The eight sector portions become the wall plate 61. The elements 62B are arranged in the direction of the axis so that ends of the partial wall plates 51 contact the wall plate 61 of the adjacent element 62B.

Since the element 62 is formed by sheet-metal working, it is possible to cut cost.

21. 21st Embodiment

Figure 25:
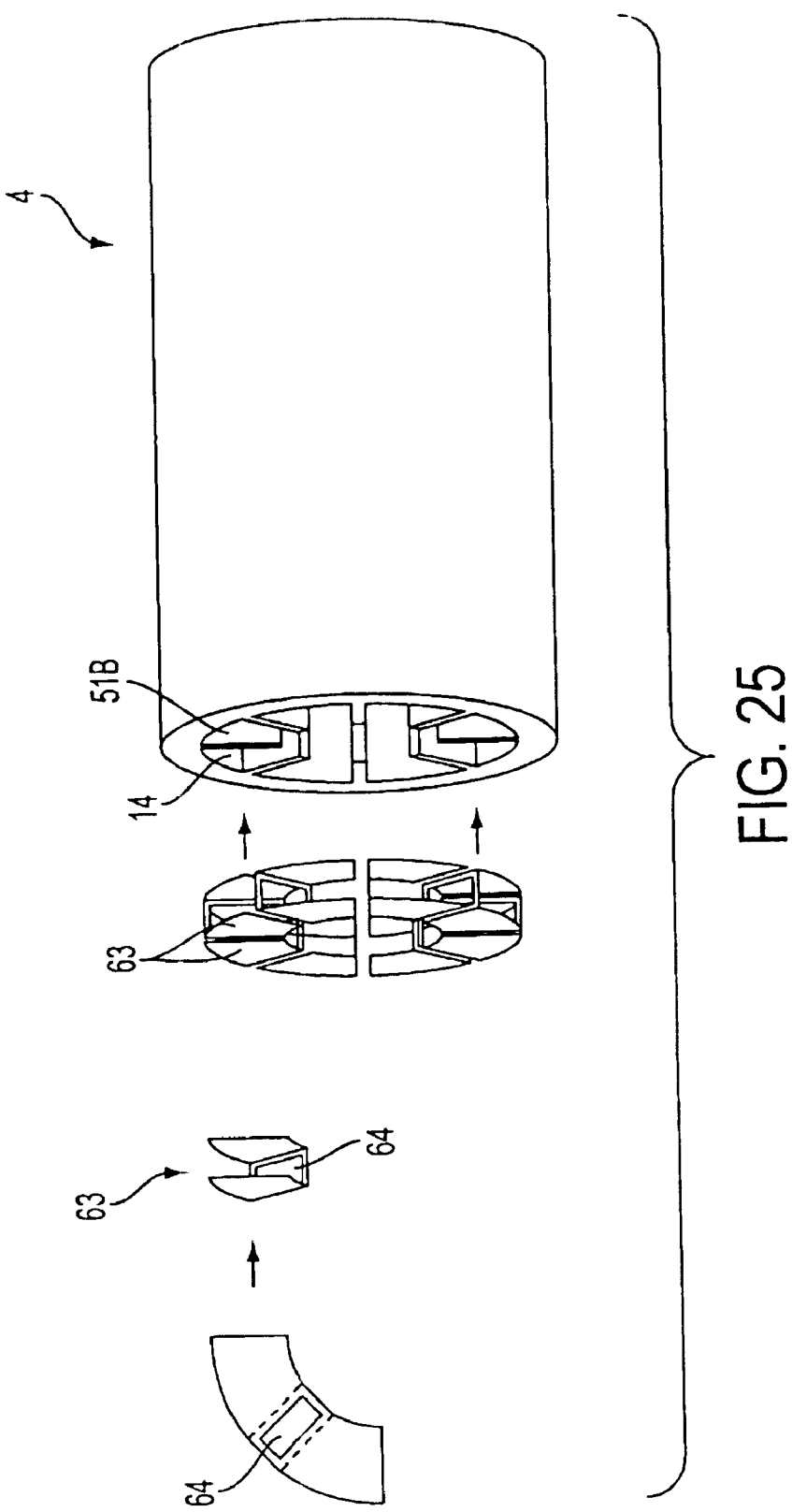
FIG. 25 is a schematic view of a portion of a rotor in a 21st embodiment.

FIG. 25 shows schematically a portion of the shaft 4. This embodiment is almost the same as the 19th embodiment except for a wall plate 51B and an element 63.

The wall plate 51B projects from the cylindrical surface 14. That is, the wall plate 51B and the large-diameter center portion 6 of the shaft 4 are single-piece. Therefore, the wall plate 51B effectively acts as a radiating fin.

The element 63 is formed by a metal sheet. That is, the element 63 before processing is a flat sector-like shape, and has two sector portions and one rectangle portion. By the processing, the element 63 becomes a U-shape which has a rectangle bottom. The element 63 is inserted between adjacent wall plates 51B so that the rectangle bottom contacts the wall plate 51B. The two sector portions become the wall plate 61. Since a hole 64 is formed at the rectangle bottom, the coolant directly contacts the wall plate 51B. Therefore, the function as a radiating fin of the wall plate 51B is not reduced.

22. 22nd Embodiment

Figure 26:
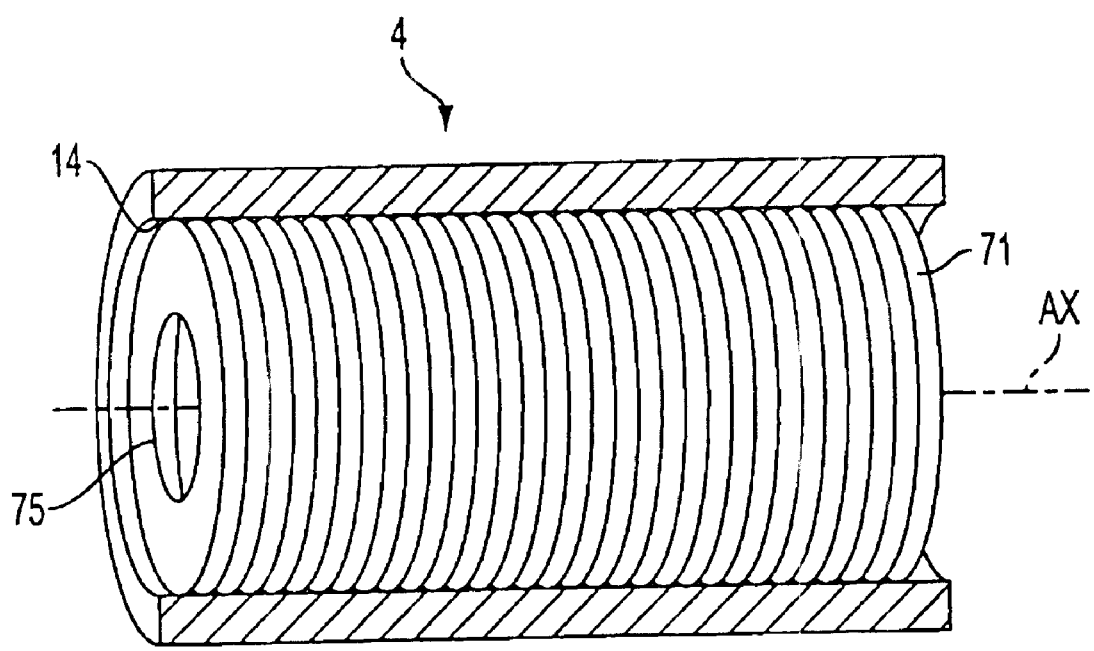
FIG. 26 is an internal view of a rotor in a 22nd embodiment.

FIG. 26 shows schematically a portion of the shaft 4. The shaft 4 is a part of the rotor of a permanent magnet type synchronous motor. Common reference numerals are used in common elements between this embodiment and the first embodiment.

In this embodiment, a lot of thin disk plates 71 are fixed to the cylindrical surface 14. The disk plate 71 has a hole 75 which is located at the center of the disk plate 71. A bore diameter of the hole 75 is approximately equal to the inner diameter of the inlet passage 11 and the outlet passage 12.

A clearance between adjacent disk plates 71 is slight. Ideally, the dimension of the clearance is approximately equal to the dimension of a velocity boundary layer on a surface of the disk plate 71. Since the clearance is slight, the coolant between adjacent disk plates 71 rotates with a rotation speed close to the rotation speed of the shaft 4. Therefore, the most of the coolant in the peripheral space 15 rotates together with the shaft 4, so that the centrifugal acceleration field is generated. That is, in this embodiment, the sub-stream is generated by the same mechanism as the 16th embodiment. Although the gradient of the centrifugal force in the direction of the axis AX exists slightly, since the clearance is slight, development of the sub-stream by the mechanism of the first embodiment may not be sufficient.

In this embodiment, two kinds of disk plate are used. FIG. 27(A) and FIG. 27(B) show a disk plate 71B. The disk plate 71B has four small projections 72 and two depressions 74. The disk plate 71B is cut out from metal sheet by stamping, and it is possible to form the small projection 72 and depression 74 at the time of the stamping. FIG. 27(C) and FIG. 27(D) show a disk plate 71C. Although the disk plate 71C has the projections 72 and the depressions 74 too, relative position between the projections 72 and the depressions 74 differs from that of the disk plate 71B. Two projections 73 are formed on the cylindrical surface 14, as shown in FIG. 27(E). The disk plate 71B and the disk plate 71C are arranged alternately, and are fixed to the cylindrical surface 14 by fitting the two projections 73 into the two depressions 74. The projection 72 contacts a back surface of an adjacent disk plate, so that the slight clearance is created. That is, it is possible to adjust the clearance by adjusting the height of the projection 72.

23. 23rd Embodiment

Figure 28:
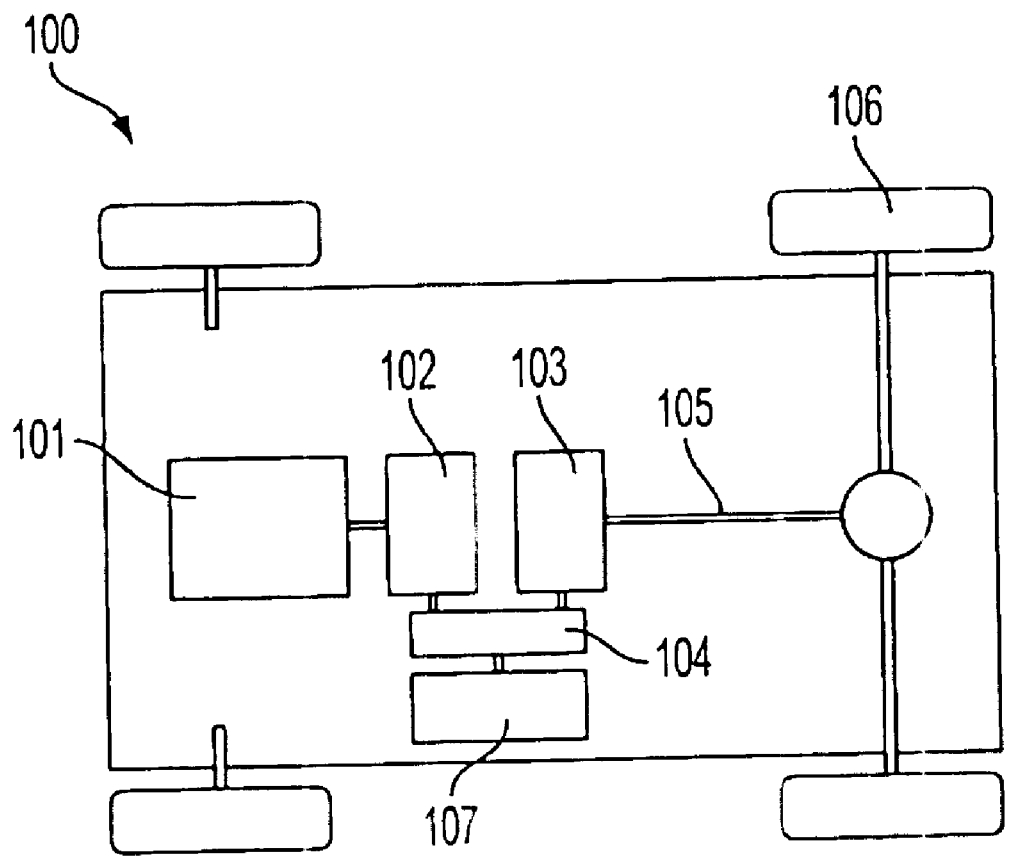
FIG. 28 is a schematic view of a vehicle in a 23rd embodiment.

FIG. 28 shows schematically a hybrid vehicle 100. The hybrid vehicle has an internal combustion engine 101 and two permanent magnet type synchronous motors 102, 103. A rotor of the motor 102 is connected to an output shaft of the engine 101. The motor 102 is driven by the engine 101. That is, the motor 102 acts as a generator. The electric power generated by the motor 102 is supplied to the motor 103 through an electric current control device 104 and is consumed by the motor 103. A rotor of the motor 103 is connected to a drive shaft 105. The drive shaft 105 is connected to drive wheels 106 through a final gear. A difference between the generated electric power and the consumed electric power is absorbed by a battery 107.

In this embodiment, the present invention is applied to the rotor of the motor 102 and the rotor of the motor 103.

A rotation speed range of the motor 102 is very wide, and zero (halt) is within the range. Circumstances about the motor 103 are the same as the above circumstances about the motor 102. Therefore, it is impossible to always obtain the contact and the mixing between the main-stream and the sub-stream. In such a case, the specifications of the peripheral space within the rotor are determined so that the contact and the mixing are obtained in a predetermined high speed range in the range. The predetermined high speed range is a range in which the demagnetization of the permanent magnet might occur.

The above description of the coolant stream within the shaft is based on our current understanding of the coolant stream. Additional study in this area may provide an even fuller understanding of the coolant stream within the shaft. The design of the invention does not depend on the above description of the coolant stream being 100% accurate.

The entire contents of Japanese Patent Application 2002-29197 (filed Feb. 6, 2002) are incorporated herein by reference.

Although the invention has been described above with reference to certain embodiments of the invention, the invention is not limited to the embodiments described above. Various modifications and variations of the embodiments described above will occur to those skilled in the art, in light of the above teachings, and are also considered a part of the present invention.

What is claimed is:

1. A cooling method for a rotation object having a rotation axis and an inner space, the inner space having a coolant inlet which is located on the rotation axis and a coolant outlet which is located on the rotation axis, the coolant inlet and the coolant outlet facing each other, the cooling method comprising:

generating a main-stream of the coolant in a central space of the inner space, the main-stream flowing straightly along the rotation axis from the coolant inlet to the coolant outlet;

generating a sub-stream of the coolant in a peripheral space around the central space, the sub-stream circulating in a radial direction of the inner space; and generating a contact between the main-stream and the sub-stream, the contact being attended with a mix of the coolant of the main-stream and the coolant of the sub-stream.

2. A cooling method for a rotation object as claimed in claim 1, wherein the generating of the sub-stream includes:

rotating the coolant in the peripheral space about the rotation axis, a rotation speed of the coolant becoming low with increase of distance from an inner surface which encloses the peripheral space; and generating an axial gradient of centrifugal force on the coolant in the peripheral space.

3. A cooling method for a rotation object as claimed in claim 2, wherein the generating of the axial gradient includes:

generating a first axial gradient of the centrifugal force in a first section of the peripheral space, a magnitude of the centrifugal force at a same radial position in the first axial gradient becoming small as an axial position approaches the coolant outlet; and generating a second axial gradient of the centrifugal force in a second section of the peripheral space, a magnitude of the centrifugal force at a same radial position in the second axial gradient becoming small as an axial position approaches the coolant inlet.

4. A cooling method for a rotation object as claimed in claim 3, wherein the first axial gradient is generated by a first flat surface which is a part of the inner surface, is normal to the rotation axis, faces the coolant outlet, and drags the coolant in the first section.

5. A cooling method for a rotation object as claimed in claim 3, wherein the second axial gradient is generated by a second flat surface which is a part of the inner surface, is normal to the rotation axis, faces the coolant inlet, and drags the coolant in the second section.

6. A cooling method for a rotation object as claimed in claim 3, wherein the first axial gradient is generated by an expanding surface which is a part of the inner surface, has a center axis coaxial with the rotation axis, has an inner diameter becoming large as an axial position approaches the coolant outlet, and drags the coolant in the first section.

7. A cooling method for a rotation object as claimed in claim 3, wherein the second axial gradient is generated by a contracting surface which is a part of the inner surface, has a center axis coaxial with the rotation axis, has an inner diameter becoming small as an axial position approaches the coolant outlet, and drags the coolant in the second section.

8. A cooling method for a rotation object as claimed in claim 3, wherein the generating of the first axial gradient includes generating two or more first axial gradients in two or more first sections, and the generating of the second axial gradient includes generating two or more second axial gradients in two or more second sections.

9. A cooling method for a rotation object as claimed in claim 1, wherein the step of generating the sub-stream includes:
   rotating the coolant in the peripheral space about the rotation axis, a rotation speed of the coolant being approximately uniform in the peripheral space;
   generating a centrifugal acceleration field on the coolant in the peripheral space; and
   generating a radial gradient of temperature of the coolant in the peripheral space.

10. A cooling structure for a rotation object having a center portion and two end portions, the center portion and the two end portions being arranged on a rotation axis of the rotation object, the cooling structure comprising:
    an inner surface enclosing an inner space which is inside of the center portion and is filled with coolant;
    an inlet passage being located inside of the one end portion and having a coolant inlet which is opened on the inner surface; and
    an outlet passage being located inside of the another end portion and having a coolant outlet which is opened on the inner surface;
    wherein the coolant inlet and the coolant outlet are located on the rotation axis and facing each other, so that a central space which is defined as a space between the coolant inlet and the coolant outlet and a peripheral space which is defined as a space around the central space are formed in the inner space.

11. A cooling structure for a rotation object as claimed in claim 10, wherein a main-stream of the coolant flowing straightly along the rotation axis from the coolant inlet to the coolant outlet is generated in the central space and a sub-stream of the coolant circulating in a radial direction of the inner space is generated in the peripheral space.

12. A cooling structure for a rotation object as claimed in claim 10, wherein the inner surface includes a first flat surface which is normal to the rotation axis and faces the coolant outlet.

13. A cooling structure for a rotation object as claimed in claim 12, further comprising an impeller fixed to the first flat surface.

14. A cooling structure for a rotation object as claimed in claim 10, wherein the inner surface includes a second flat surface which is normal to the rotation axis and faces the coolant inlet.

15. A cooling structure for a rotation object as claimed in claim 14, further comprising an impeller fixed to the second flat surface.

16. A cooling structure for a rotation object as claimed in claim 10, wherein the inner surface includes an expanding surface which has a center axis coaxial with the rotation axis and has an inner diameter becoming large as an axial position approaches the coolant outlet.

17. A cooling structure for a rotation object as claimed in claim 10, wherein the inner surface includes a contracting surface which has a center axis coaxial with the rotation axis and has an inner diameter becoming small as an axial position approaches the coolant outlet.

18. A cooling structure for a rotation object as claimed in claim 10, further comprising a plate which is fixed to the inner surface, is normal to the rotation axis, has a hole which is located on the rotation axis, and divides the peripheral space in a direction of the rotation axis.

19. A cooling structure for a rotation object as claimed in claim 18, further comprising a plurality of the plates, wherein a slight clearance is created between adjacent plates.

20. A cooling structure for a rotation object as claimed in claim 10, further comprising a plate which is fixed to the inner surface and divides the peripheral space in a direction of a circumference of the inner surface.

21. A cooling structure for a rotation object as claimed in claim 20, further comprising a plate which divides the peripheral space in a direction of the rotation axis.

22. A cooling structure for a rotation object as claimed in claim 10, wherein the rotation object is a rotor of a permanent magnet type synchronous motor, the rotor being constructed of a rotor core which is provided with a permanent magnet and of a shaft which penetrates the rotor core, the center portion being constructed of the rotor core and a large-diameter center portion of the shaft, the two end portions being small-diameter end portions of the shaft.

23. A cooling structure for a rotation object as claimed in claim 10, wherein the rotation object is a rotor configured for a vehicle drive motor.

24. A cooling structure for a rotation object as claimed in claim 10, wherein the rotation object is a rotor configured for a generator of a hybrid vehicle.

25. A cooling structure for a rotation object having a rotation axis and an inner space, the inner space having a coolant inlet which is located on the rotation axis and a coolant outlet which is located on the rotation axis, the coolant inlet and the coolant outlet facing each other, the cooling structure comprising:
    means for generating a main-stream of the coolant in a central space of the inner space, the main-stream flowing straightly along the rotation axis from the coolant inlet to the coolant outlet;
    means for generating a sub-stream of the coolant in a peripheral space around the central space, the sub-stream circulating in a radial direction of the inner space; and
    means for generating a contact between the main-stream and the sub-stream, the contact being attended with a mix of the coolant of the main-stream and the coolant of the sub-stream.

* * * * *